US007519046B2

United States Patent
Suzuki et al.

(10) Patent No.: US 7,519,046 B2
(45) Date of Patent: Apr. 14, 2009

(54) ACCESS PATH MANAGEMENT METHOD AND PROGRAM

(75) Inventors: Tomohiko Suzuki, Odawara (JP); Kyosuke Achiwa, Yamato (JP)

(73) Assignee: Hitachi, Ltd., Tokyo (JP)

( * ) Notice: Subject to any disclaimer, the term of this patent is extended or adjusted under 35 U.S.C. 154(b) by 638 days.

(21) Appl. No.: 11/227,492

(22) Filed: Sep. 16, 2005

(65) Prior Publication Data
US 2007/0016681 A1    Jan. 18, 2007

(30) Foreign Application Priority Data
Jul. 15, 2005   (JP) .............................. 2005-207295

(51) Int. Cl.
*H04L 12/28* (2006.01)
(52) U.S. Cl. .................. 370/351; 709/224; 709/227
(58) Field of Classification Search ................ 370/228, 370/351; 709/224, 229
See application file for complete search history.

(56) References Cited

U.S. PATENT DOCUMENTS 6,343,324 B1 * 1/2002 Hubis et al. ................. 709/229
6,775,230 B1 * 8/2004 Watanabe et al. ............ 370/228
2004/0064543 A1 * 4/2004 Ashutosh et al. ............ 709/224

FOREIGN PATENT DOCUMENTS

JP    2003-167794    6/2003

* cited by examiner

*Primary Examiner*—Chi H Pham
*Assistant Examiner*—Albert T Chou
(74) *Attorney, Agent, or Firm*—Mattingly, Stanger, Malur & Brundidge, P.C.

(57) ABSTRACT

A host and a storage system are connected via at least one intermediate device so as to be able to communicate. The storage system comprises a storage device, which makes it possible to store data. The host recognizes a logical path from this host to the storage device. In this case, a computer, which is able to read in and execute a computer program, carries out processing for specifying a plurality of physical paths, which exist between the host and the storage system; specifying to which physical path of the specified plurality of physical paths the logical path corresponds; and making the logical path correspond to the specified physical path.

9 Claims, 22 Drawing Sheets

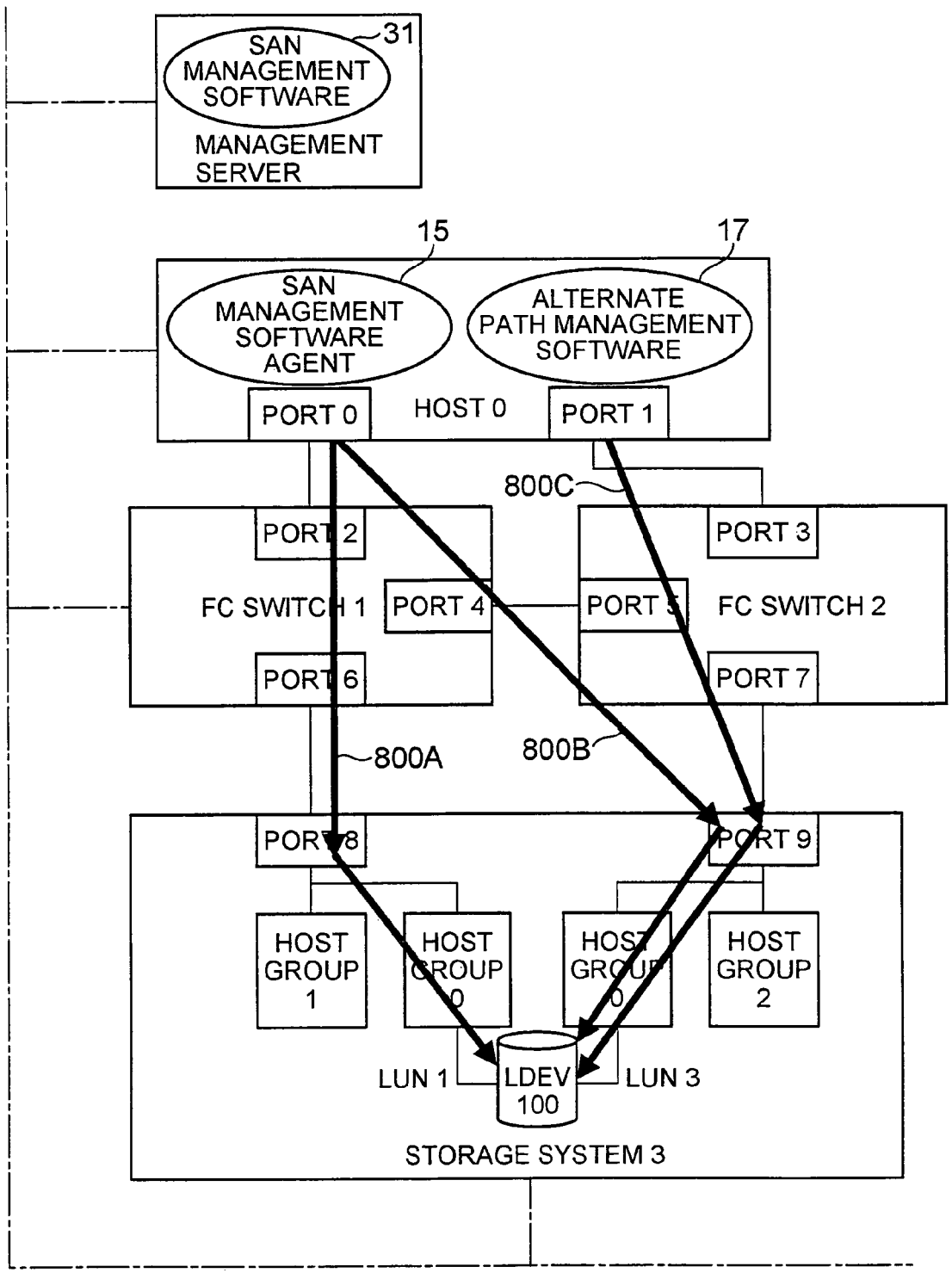

| NODE ID | NODE NAME | NODE TYPE | OWN NODE PORT NAME | ADJACENT PORT NAME | |
|---|---|---|---|---|---|
| 0 | HOST 0 | HOST | PORT 0 | PORT 2 | } 47A |
| | | | PORT 1 | PORT 3 | |
| 1 | FC SWITCH 1 | FCSW | PORT 2 | PORT 0 | } 47B |
| | | | PORT 4 | PORT 5 | |
| | | | PORT 6 | PORT 8 | |
| 2 | FC SWITCH 2 | FCSW | PORT 3 | PORT 1 | } 47C |
| | | | PORT 5 | PORT 4 | |
| | | | PORT 7 | PORT 9 | |
| 3 | STORAGE SYSTEM 3 | STRS | PORT 8 | PORT 6 | } 47D |
| | | | PORT 9 | PORT 7 | |

| PORT NAME | HOST GROUP ID | LUN | LDEV NUMBER |
|---|---|---|---|
| PORT 8 (WWN 8) | ... | ... | ... |
| | | ... | ... |
| | 1 | ... | ... |
| | | ... | ... |
| | 0 | ... | ... |
| | | 1 | 100 |
| | | ... | ... |
| | ... | ... | ... |
| | | ... | ... |
| PORT 9 (WWN 9) | ... | ... | ... |
| | | ... | ... |
| | 0 | ... | ... |
| | | 3 | 100 |
| | | ... | ... |
| | 2 | ... | ... |
| | | ... | ... |
| | ... | ... | ... |

| IN-NODE VOLUME NAME | ALTERNATE PATH ID | HOST PORT NAME | STORAGE PORT NAME | LDEV NUMBER |
|---|---|---|---|---|
| D: | 0 | PORT 0 | PORT 8 | 100 |
|    | 1 | PORT 0 | PORT 9 | 100 |
|    | 2 | PORT 1 | PORT 9 | 100 |

51

| NODE NAME | IN-NODE VOLUME NAME | ALTERNATE PATH ID | HOST PORT NAME | STORAGE PORT NAME | LDEV NUMBER |
|---|---|---|---|---|---|
| HOST 0 | D: | 0 | PORT 0 | PORT 8 | 100 |
|        |    | 1 | PORT 0 | PORT 9 | 100 |
|        |    | 2 | PORT 1 | PORT 9 | 100 |

53

51

| NODE NAME | IN-NODE VOLUME NAME | ALTERNATE PATH ID | PHYSICAL PATH ID | HOST GROUP ID | LUN | LDEV NUMBER |
|---|---|---|---|---|---|---|
| HOST 0 | D: | 0 | 1 | 0 | 1 | 100 |
| | | 1 | 0 | 0 | 3 | 100 |
| | | 2 | 3 | 0 | 3 | 100 |

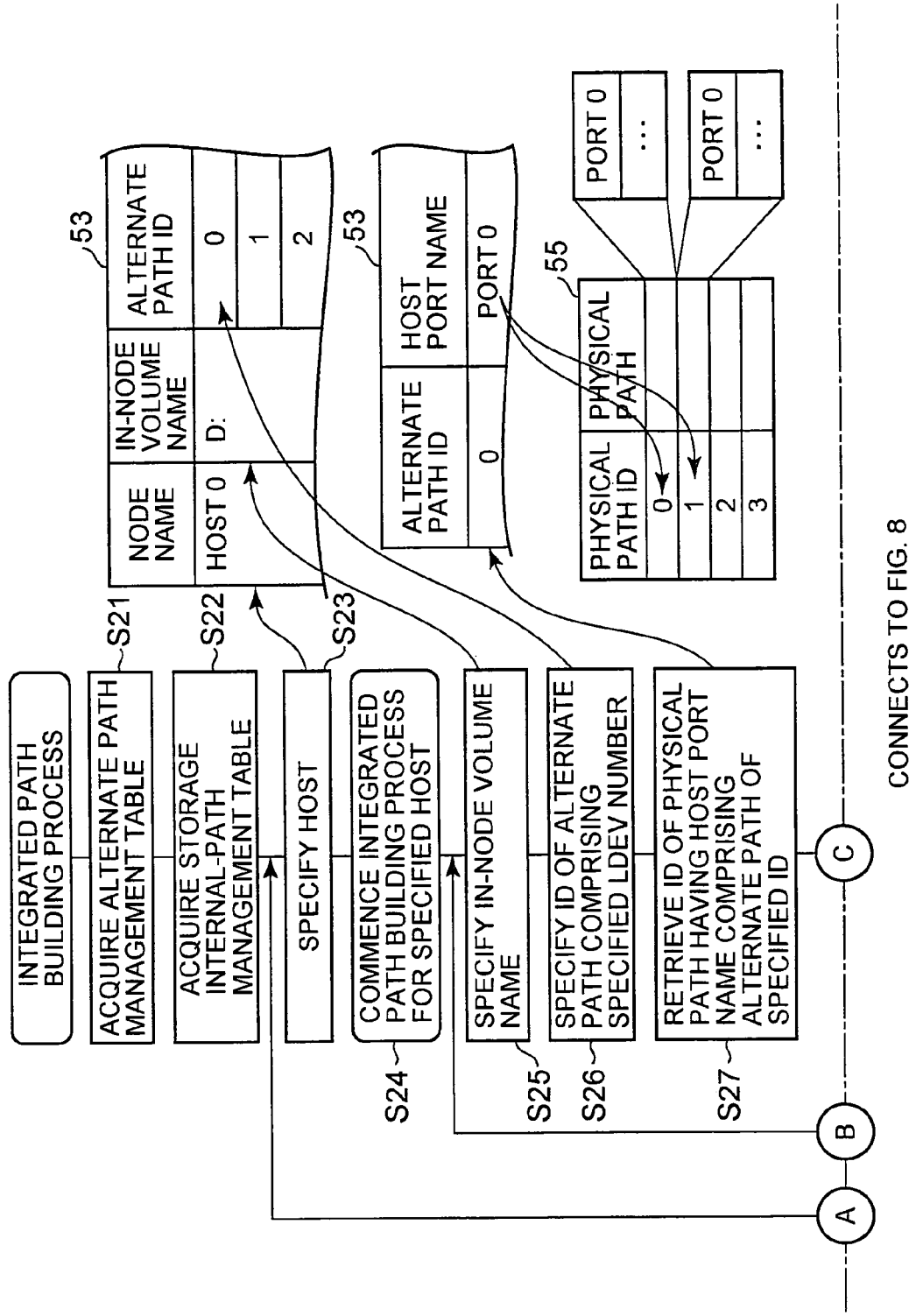

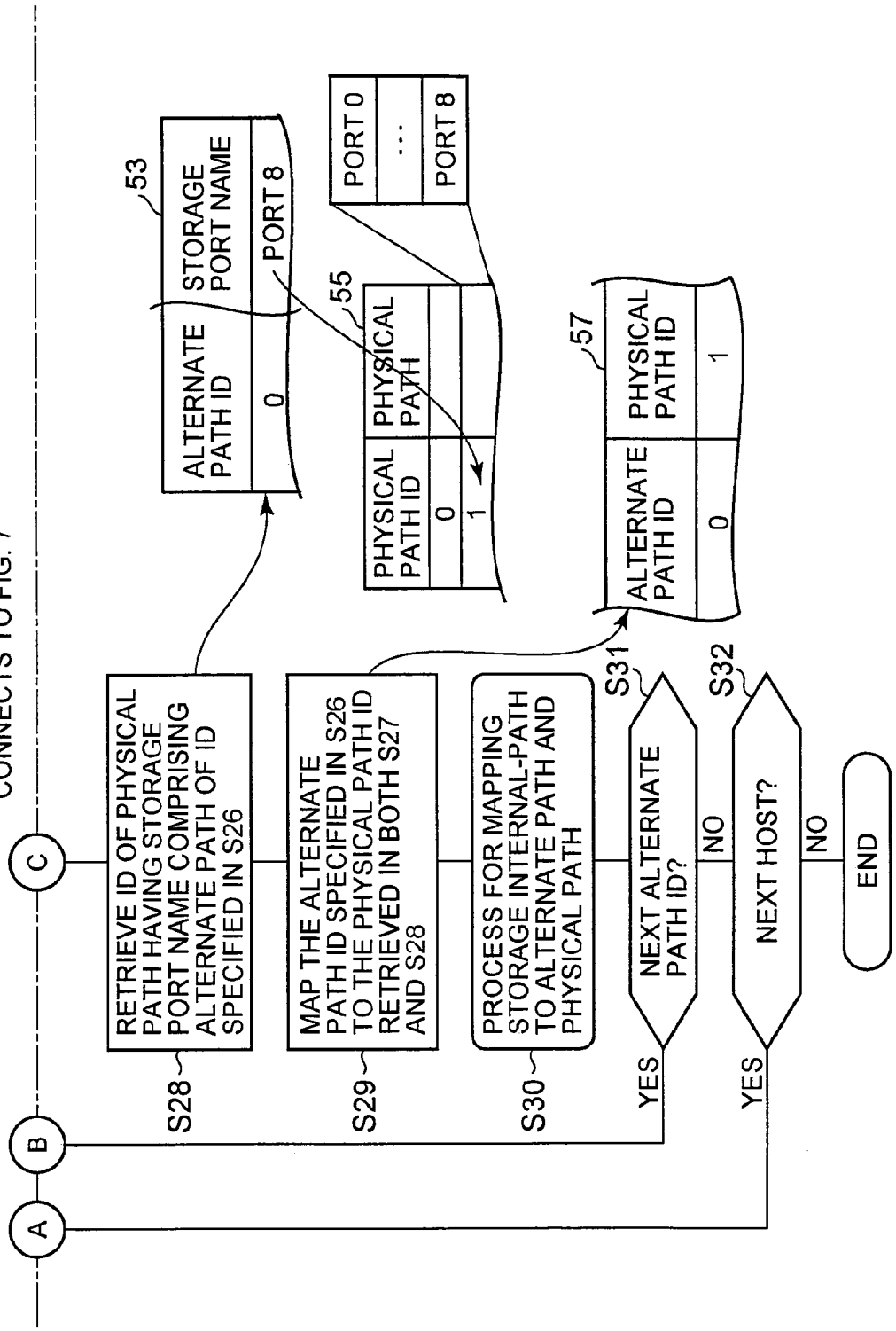

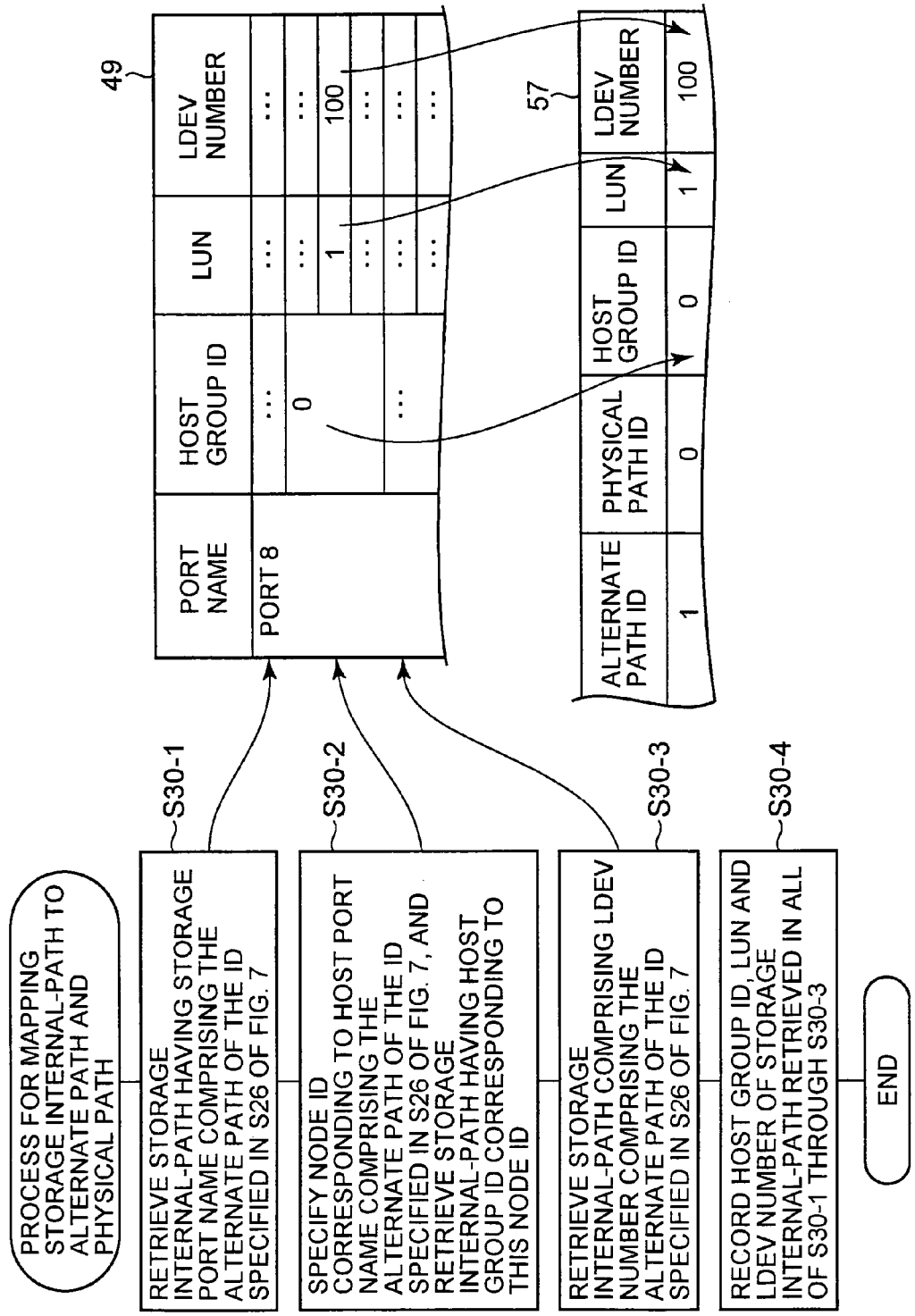

ACCESS PATH MANAGEMENT METHOD AND PROGRAM

CROSS-REFERENCE TO PRIOR APPLICATION

This application relates to and claims priority from Japanese Patent Application No. 2005-207295, filed on Jul. 15, 2005, the entire disclosure of which is incorporated herein by reference.

1. Field of the Invention

The present invention relates to technology for managing an access path.

2. Background of the Invention

For example, the technology disclosed in Japanese Laid-open Patent No. 2003-167794 is known. According to this official gazette, a server and disk system are connected via a SAN (Storage Area Network), the access path between the server and the disk system is analyzed, and the redundancy for this access is diagnosed. As for redundancy, when a server is accessing a disk system, if it becomes impossible to utilize either a path between devices or the above-mentioned connection device on an access path, there is determined to be redundancy when another access path can be substituted.

SUMMARY OF THE INVENTION

However, for example, a disk system or other such storage system comprises a plurality of physical storage devices, and a plurality of logical storage devices (hereinafter, logical devices) can be provided on these physical storage devices. A host can recognize a logical access path (hereinafter, called "logical path" for the sake of brevity) to a logical device, and can access a logical device via this logical path.

A host can also recognize a plurality of logical paths for the same logical device (sometimes called "alternate paths"). A host can select an arbitrary logical path from among the plurality of logical paths, and can access a logical device via the selected logical path. Further, when the host is not able to access a logical device via a selected alternate path, it can select another logical path and access the logical device via this other logical path.

One conceivable reason for a host not being able to achieve access via a selected logical path is that a malfunction has occurred in at least one of the plurality of physical access paths (hereinafter, physical paths), which exist between the host and the storage system. A physical path, for example, is a path, which is constructed from a variety of hardware resources (for example, ports, and the cables that interconnect the ports).

For example, in a SAN environment, ordinarily a logical path and a physical path are managed separately. More specifically, for example, a host for carrying out access to a logical device manages the logical path, and a server for managing the SAN manages the physical path. Thus, various problems can occur. For example, even when it is not possible to use a certain logical path, when a host selects this logical path and tries to carry out access via same, the host is not able to detect the fact that this logical path is not capable of being used. Further, for example, when a malfunction occurs in a certain physical path making it impossible to utilize one or more logical paths, it is difficult for a host to determine which physical path should be restored in order to restore which logical path.

In a system comprising a host and a storage system, there are also cases in which a different type of access path exists in addition to the above-mentioned physical path and logical path. For example, there are cases when an access path exists from a storage system port to a storage system storage device.

Therefore, an object of the present invention is to improve the management of an access path in a system comprising a host and a storage system.

Other objects of the present invention will become clear from the following explanation.

For example, a host and a storage system are connected via at least one intermediate device so as to be able to communicate. The above-mentioned storage system comprises a storage device, which makes it possible to store data. The above-mentioned host recognizes a logical path from the above-mentioned host to the above-mentioned storage device. In this case, a computer program in accordance with a first aspect of the present invention can, by being read into and executed on a computer, specify a plurality of physical paths between the above-mentioned host and the above-mentioned storage system, specify which physical path of the above-mentioned specified plurality of physical paths corresponds to the above-mentioned logical path, and make the above-mentioned logical path correspond to the above-mentioned specified physical path. More specifically, for example, the respective physical paths comprise a plurality of path elements, and a logical path has at least one path element of the plurality of path elements of the physical paths, and this computer program specifies from among the plurality of physical paths a physical path having a path element, which conforms to the path element of the logical path, and makes this logical path correspond to the specified physical path.

In one embodiment, a computer program, by being read into and executed on a computer, can prepare and output information for displaying which physical path the above-mentioned logical path corresponds to. The outputted information is provided to a prescribed display control program either inside the same computer or inside a remote computer, and can be displayed on a display screen by this display control program.

In this embodiment, for example, the computer program, by being read into and executed on a computer, can prepare a screen for display on a display device, and plot various physical path objects of the above-mentioned specified plurality of physical paths on the above-mentioned screen. Further, the above-mentioned computer program can also plot on the above-mentioned screen a logical path object representing the above-mentioned logical path, either overlapping the physical object of the physical path to which the above-mentioned logical path corresponds, or in the vicinity thereof. Further, the above-mentioned computer program can output a screen on which a plurality of physical path objects and the above-mentioned logical path object have been plotted.

Now then, in another embodiment, each intermediate device can comprise a plurality of intermediate ports, which are ports to which the above-mentioned host, the above-mentioned storage system or another intermediate devices is connected. The above-mentioned host can comprise a host port, which is a port to which an intermediate device is connected, and a storage resource, which is capable of storing the above-mentioned logical path. The above-mentioned storage system can comprise a storage port, which is a port to which an intermediate device is connected. The above-mentioned logical path can be represented by a host/storage port ID for specifying at least one of the above-mentioned host port and the above-mentioned storage port, and a storage device ID for specifying the above-mentioned storage device. The above-mentioned physical path can be represented by a host port ID for specifying the above-mentioned host port, an intermediate port ID for specifying the above-mentioned intermediate port, and a storage port ID for specifying the above-mentioned storage port. The above-mentioned computer program can specify the physical path to which the above-mentioned logical path corresponds by specifying, from among the above-mentioned plurality of physical paths, the physical path comprising either the host port ID or the storage port ID, which conforms to the host/storage port ID comprising the above-mentioned logical path. Furthermore, the various IDs can be a name, number or worldwide name.

Further, in this embodiment, the computer program can acquire a first node information comprising the above-mentioned host port ID, and the intermediate port ID of the intermediate port connected to the host port corresponding to this host port ID. Further, the above-mentioned computer program can also acquire a second node information, which is the node information of each individual intermediate device, and which comprises the intermediate port IDs corresponding to all of the respective intermediate ports comprising an intermediate device, and the port IDs of the other ports connected to the respective intermediate ports. Further, the above-mentioned computer program can also acquire a third node information comprising the above-mentioned storage port ID, and the intermediate port ID of the intermediate port connected to a storage port corresponding to this storage port ID. Further, the above-mentioned computer program can specify the above-mentioned plurality of physical paths by analyzing a node information group comprising the above-mentioned acquired first node information, second node information, and third node information, and specifying which port having a port ID is connected to which other port having a port ID.

In one embodiment, the above-mentioned computer program can detect when a malfunction occurs in a node, which is the above-mentioned host, the above-mentioned storage system, or the above-mentioned intermediate device, specify the physical path comprising the above-mentioned malfunctioning node, determine whether or not the above-mentioned logical path has been made correspondent to the above-mentioned specified physical path, and execute prescribed processing when it determines that the above-mentioned logical path corresponds to the above-mentioned specified physical path. For example, when the above-mentioned host is constituted so as to recognize a plurality of logical paths to the same storage device, and to access the above-mentioned storage device using an arbitrary logical path from among the above-mentioned plurality of logical paths, as the above-mentioned prescribed processing, it can execute processing, whereby the host that recognizes the above-mentioned logical path is notified of the fact that the above-mentioned logical path is an unusable logical path. Further, for example, as the above-mentioned prescribed processing, the above-mentioned host can prepare and output information disclosing which logical path of the above-mentioned plurality of logical paths corresponds to which physical path of the above-mentioned plurality of physical paths, where a malfunction has occurred in the above-mentioned specified physical path, and the fact that the logical path corresponding to the above-mentioned specified physical path is not usable.

In one embodiment, a plurality of hosts can be connected to the above-mentioned at least one intermediate device. The above-mentioned storage system can comprise a plurality of storage devices, and a storage resource capable of storing access control data for controlling which host can access which storage device, and can be constituted such that when it receives a request from a certain host to access a certain storage device, if the above-mentioned certain host is set as having permission to access the above-mentioned certain storage device, it can allow this access, and if the above-mentioned certain host is set as not having permission to access the above-mentioned certain storage device, it can disallow this access. The above-mentioned computer program determines which host can access which storage device based on the above-mentioned access control data, and can notify each host as to which storage device this host can access.

In one embodiment, the above-mentioned host can be constituted so as to recognize a plurality of logical paths to the same storage device, and to access the above-mentioned storage device using an arbitrary logical path from among the above-mentioned plurality of logical paths. The above-mentioned computer program can determine whether or not there is a physical path having a part, which corresponds to a prescribed number or more of logical paths from among the above-mentioned plurality of logical paths, and when it determines that such a part exists, can output a prescribed warning.

The above-mentioned computer program can be stored on a CD-ROM or some other such recording medium. In this case, a computer can read in and install the above-mentioned computer program from this recording medium.

Further, the above-mentioned computer program can also be downloaded to a computer via the Internet or some other communications network.

Further, the above-mentioned computer can be either a CPU or other processor, or it can be an information processing device (for example, a personal computer, server machine, or workstation) comprising a CPU and memory. The information processing device, for example, can be any of a management server, which will be discussed hereinbelow, a host or a storage system.

BRIEF DESCRIPTION OF THE DRAWINGS

FIG. 3 shows an example of a logical path recognized by "host 0" of FIG. 2;

FIG. 7 shows one part of an example of the flow of an integrated path-building process;

FIG. 8 shows the remaining part of an example of the flow of an integrated path-building process;

FIG. 9 shows an example of the specific flow of processing in S30 of FIG. 8;

DETAILED DESCRIPTION OF THE PREFERRED EMBODIMENTS

Figure 1:
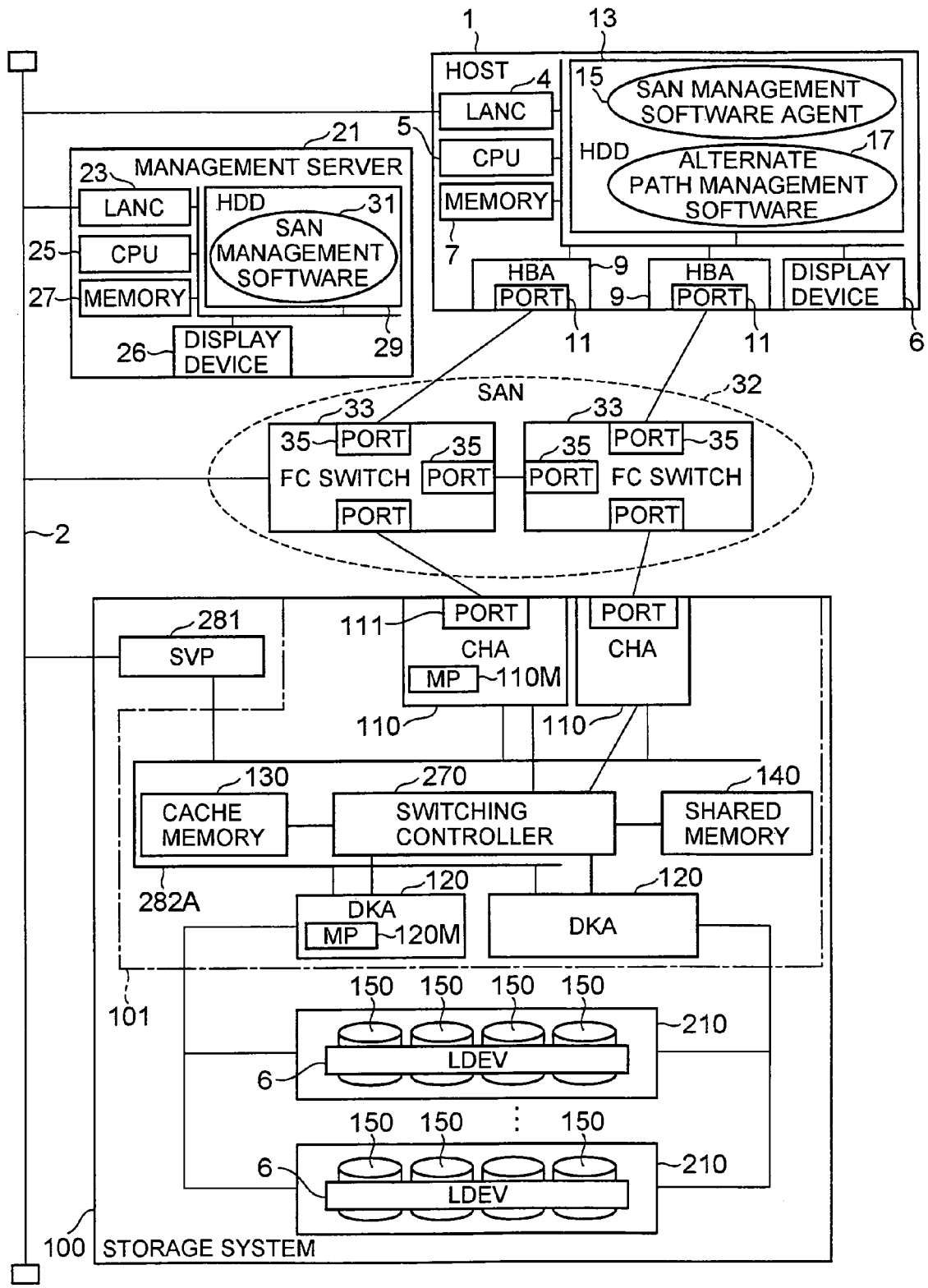
FIG. 1 shows an example of the overall hardware constitution of a system related to a first embodiment of the present invention.

FIG. 1 shows an example of the overall hardware constitution of a system related to a first embodiment of the present invention.

There is a host 1; a plurality of fibre channel switches (hereinafter, FC switches) 33, 33, constituting a SAN 32; a management server 21; and a storage system 100. The host 1 and the storage system 100 are connected via the SAN 32 (that is, through at least one FC switch 33) so as to be able to communicate with one another. The host 1, at least one FC switch 33, the management server 21, and the storage system 100 are connected to a LAN 2 or other such management network.

The number of hosts 1 connected to the SAN 32 in FIG. 1 is set at one in order to make the explanation easier to understand, but, of course, a plurality of hosts can be connected to the SAN 32. The host 1, for example, is a computer machine comprising a plurality of hardware resources, such as a server machine or a client machine. As the plurality of hardware resources, for example, there are a LAN controller (hereinafter LANC) 4 for controlling communications via the LAN 2; a CPU 5 for controlling the overall operation of the host 1; storage resources (for example a memory 7 and a hard disk drive 13) capable of storing a variety of data; a display device 6; and host path adapters 9, 9, which have ports 11 connected to the SAN 32, and which control communications via the SAN 32. A computer program, which is loaded into a memory 7, and read into and executed by the CPU 5, can be stored in a hard disk drive (hereinafter, HDD) 13. As this computer program, for example, there is a SAN management software agent 15, which will be explained hereinbelow, and alternate path management software 17.

Each FC switch 33 has a plurality of ports 35, 35, . . . Each port 35 of an FC switch 33 is connected to any of the host 1, the storage system 100, and another FC switch 33.

A management server 21 is a computer machine comprising a plurality of hardware resources. As the plurality of hardware resources, for example, there is a LAN 23; a display device 26; a CPU 25 for controlling the overall operation of the management server 21; and storage resources (for example, a memory 27 and an HDD 31) capable of storing a variety of data. A computer program, which is loaded into the memory 27, and read into and executed by the CPU 25, can be stored in the HDD 31. As this computer program, for example, there is SAN management software 31, which will be explained hereinbelow.

In FIG. 1, only one storage system 100 is connected to the SAN 32 in order to make the explanation easier to understand, but, of course, a plurality of storage systems 100 can be connected to the SAN 32. The storage system 100, for example, can be constituted as a disk array device, such as a RAID (Redundant Array of Independent Disks). The storage system 100, for example, comprises a controller 101 for controlling the processing carried out by the storage system 100; a RAID group 210; and a service processor (SVP) 281. The controller 101, for example, comprises either one or a plurality of disk adapters (hereinafter, DKA) 120; either one or a plurality of channel adapters (hereinafter, CHA) 110; a cache memory 130; a shared memory 140; and a switching controller 270.

A RAID group 210 comprises a plurality of HDD 150, and, for example, provides redundant memory based on RAID, such as RAID 1 and RAID 5. At least one or more logical devices (hereinafter, LDEV) 6, which are logical storage areas, can be set on top of the physical storage areas provided by the respective HDD 150. LDEV 6 can store data, which is read and written by the host 1.

The respective DKA 120 control the transfer of data to the HDD 150. Each DKA 120, for example, constitutes a microcomputer system, comprising a microprocessor (hereinafter, MP) 120M, ROM and RAM.

Each CHA 110 has at least one port 111, which can be connected to an FC switch 33, and can receive data via the FC switch 33 from the host 1. Each CHA 110, similar to the DKA 120, can be constituted as a microcomputer system comprising an MP 110M, ROM and RAM.

The cache memory 130, for example, can be constituted from either volatile or non-volatile semiconductor memory. The cache memory 130 can store data from the host 1, and data read out from LDEV 6.

The shared memory 140, for example, can be constituted from either non-volatile or volatile semiconductor memory. The shared memory 140, for example, stores various commands received from the host 1, and control information and the like utilized in the control of the storage system 100. Commands, control information and so forth can be redundantly stored by virtue of a plurality of shared memories 140. Furthermore, the cache memory 130 and the shared memory 140 can be constituted as separate, individual memories, or one part of memory can be used as a cache memory area, and another part of the same memory can be used as a shared memory.

The switching controller 270 mutually connects to each DKA 120, each CHA 110, the cache memory 130 and the shared memory 140. The switching controller 270, for example, can be constituted from an ultra-high-speed crossbar switch or the like.

The SVP 281 is a device comprising at least an input console, and, for example, can store prescribed control information (for example, a storage management table, which will be explained below) in a prescribed storage region in the storage system 100 (for example, the shared memory 140) via an internal network (for example, a LAN) 282A.

An example of the processing, which the storage system 100 carries out, will be explained hereinbelow. A CHA 110 receives a write request and write-targeted data from the host 1 via an FC switch 33. The received write request is stored in the shared memory 140, and the received write-targeted data is stored in the cache memory 130. A DKA 120 is constantly referencing the shared memory 140. When the DKA 120 discovers an unprocessed write request stored in the shared memory 140, in accordance with this write request, it reads out the write-targeted data from the cache memory 130 and performs an address conversion. The DKA 120 writes the write-targeted data to an HDD 150 having the LDEV 6 specified by the write request.

The processing of a read request from the host 1 will be explained. When a CHA 110 receives a read request from the host 1, it stores this read request in the shared memory 140. When a DKA 120 discovers an unprocessed read request inside the shared memory 140, it reads data from an HDD 150 having the LDEV 6 specified by this read request. The DKA 120 stores the read data in the cache memory 130. Further, the DKA 120 also notifies the CHA 110 by way of the shared memory 140 that the requested data read is complete. The CHA 110 reads in the data from the cache memory 130, and sends it to the host 1.

The preceding is an example of the overall hardware constitution of the system in this embodiment. Furthermore, in the following explanation, it is disclosed that this embodiment features computer program-driven operation, but in actuality, for example, operations are carried out by a CPU or other processor, which reads in and executes this computer program.

Now then, in the above-mentioned system, the host 1 can recognize a logical access path (in other words, a logical path) to an LDEV 6, specify the logical path, and issue an access request, such as a write request or a read request. Access from the host 1 to the LDEV 6 is carried out by the issued access request being sent in accordance with the specified access path. At this time, the access request goes by way of a physical access path (in other words, a physical path), which exists between the host 1 and the storage system 100.

Figure 2:
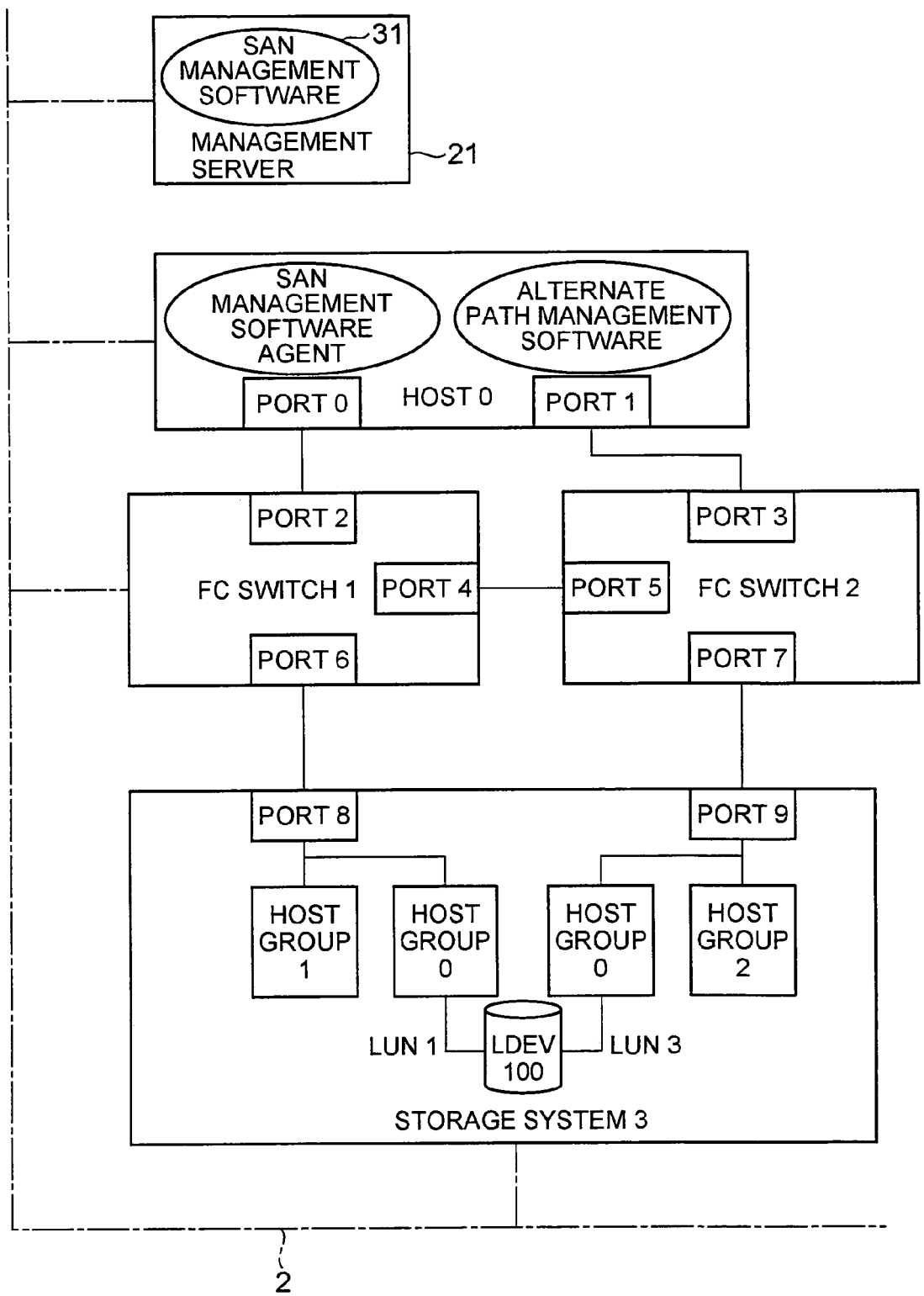
FIG. 2 is an illustration of a physical path in a first embodiment of the present invention.

FIG. 2 is an illustration of physical paths in the first embodiment of the present invention. In this embodiment, there are pluralities of the same elements (for example, hosts, ports and LDEV). Thus, in the following explanation, there will be times when the explanation uses a peculiar element ID (for example, a number) or element name instead of the reference numerals utilized in FIG. 1 for the same elements. These will not be shown in the figures in particular at this time, but, for example, when referring to an element ID as being a symbol or number such as "n", it will be called "element ID [n]", and the element itself having element ID [n] will be called "element [n]". Since at least the LDEV will be specified by number in this embodiment, they will be referred to as "LDEV number [n]" and "LDEV [n]". Further, in referring to an element name as being "A", the element name will be called "element name [A]", and when referring to the element itself having this element name, it will simply be called "A".

As shown in this figure, four physical paths exist between "host 0" and "storage system 3". For each physical path, a port of "host 0" is the start point, a port of "storage system 3" is the end point, and a port of either "FC switch 1" or "FC switch 2" constitutes an intermediate point between the start point and the end point. Stated more specifically, a first physical path can be expressed by port name "port 0" of "host 0", port name "port 2" of "FC switch 1", port name "port 6" of "FC switch 1", and port name "port 8" of "storage system 3". A second physical path can be expressed by port name "port 0" of "host 0", port name "port 2" of "FC switch 1", port name "port 4" of "FC switch 1", port name "port 5" of "FC switch 2", port name "port 7" of "FC switch 2", and port name "port 9" of "storage system 3". A third physical path can be expressed by port name "port 1" of "host 0", port name "port 3" of "FC switch 2", port name "port 7" of "FC switch 2", and port name "port 9" of "storage system 3". A fourth physical path can be expressed by port name "port 1" of "host 0", port name "port 3" of "FC switch 2", port name "port 5" of "FC switch 2", port name "port 4" of "FC switch 1", port name "port 6" of "FC switch 1", and port name "port 8" of "storage system 3". Furthermore, a port name, for example, can be a kind of name, such as WWN (World Wide Name), which can be uniquely specified regardless of the element type, and the same name can be used as the port name among element types. However, in this case (for example, when a port name of "host 0" and a port name of "FC switch 1" are the same), ports in the entire system can be identified by either a port name and device ID, or in combination with a device name.

An access request sent from either "port 0" or "port 1" of "host 0" arrives at either "port 8" or "port 9" of "storage system 3" via a physical path such as those described above. Which port of "host 0" and which port of "storage system 3" is used to access "host 0"-recognized LDEV [100] will differ according to which of the one or more logical paths recognized by "host 0" is selected.

FIG. 3 shows an example of logical paths recognized by "host 0" of FIG. 2. In this embodiment, as shown in FIG. 3, "host 0" can recognize a plurality of logical paths 800A through 800C for the same LDEV [100], and this "host 0" can either access the LDEV [100] by specifying an arbitrary logical path of the plurality of logical paths 800A through 800C, or, if it recognizes that it is not able to access LDEV [100] via this specified logical path, it can access the same LDEV [100] by specifying a different logical path. In other words, since "host 0" can switch logical paths, for the sake of convenience, a logical path will be called an "alternate path" in the following explanation.

"Host 0" recognizes three alternate paths 800A through 800C as alternate paths to LDEV [100]. A first alternate path 800A can be represented by port name "port 0" of "host 0", port name "port 8" of "storage system 3", and LDEV number [100]. A second alternate path 800B can be represented by port name "port 0" of "host 0", port name "port 9" of "storage system 3", and LDEV number [100]. A third alternate path 800C can be represented by port name "port 1" of "host 0", port name "port 9" of "storage system 3", and LDEV number [100].

However, in each physical path, the port name of "storage system 3" constitutes the end point of that path. Further, in the respective alternate paths 800A through 800C, an LDEV number follows the port name of "storage system 3".

However, as shown in FIGS. 2 and 3, information for representing the route from a port of "storage system 3" to the LDEV is set in "storage system 3". Below, for the sake of convenience, this route will be called the "storage internal-path". The storage internal-path can be represented by a port name of "storage system 3", a host group ID, a LUN and an LDEV number. Here, host group is a term describing a host capable of accessing a prescribed LDEV, for example, host group ID [0] signifies that only "host 0" of host ID [0] can access an LDEV [100] to which host group ID [0] corresponds. LUN stands for logical unit number. One or a plurality of LDEV numbers can be made to correspond to a single LUN, and conversely, one LDEV number can be made to correspond to a plurality of LUN.

The physical path, alternate path, and storage internal-path were explained above. Information representing the respective physical paths, alternate paths, and storage internal-paths can be prepared in advance by a manager or other person, and can be automatically constructed by a computer using the information prepared in advance. A specific example of this will be explained below.

Figures 4A, 4B:
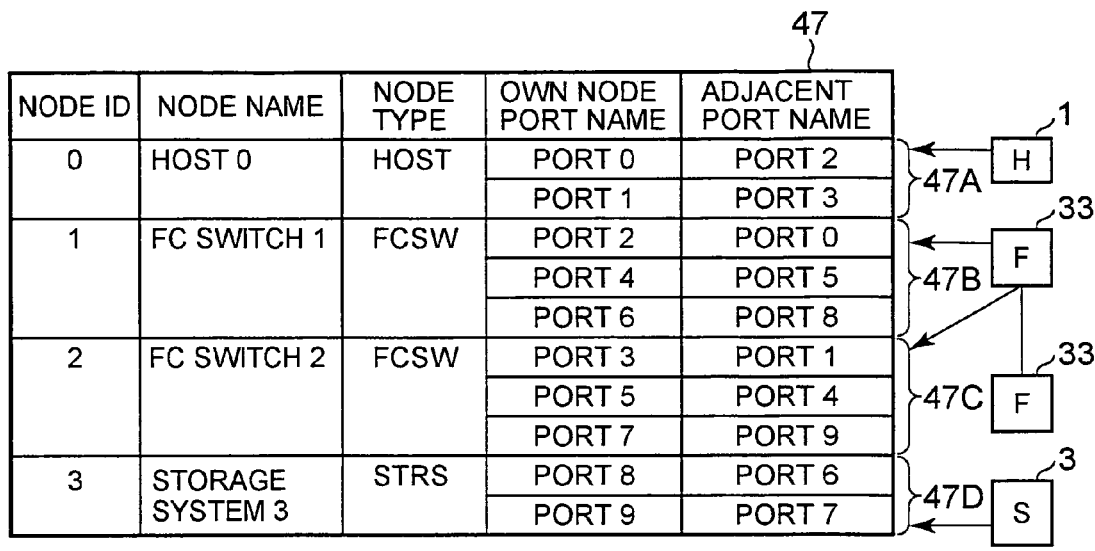
FIG. 4A shows an example of a constitution of a node management table.
FIG. 4B shows an example of a constitution of a storage internal-path management table.

FIG. 4A shows an example of the constitution of a node management table.

A node management table 47 is a table for managing a node constituting a SAN 32, and a node connected to a SAN 32. A node management table 47, for example, is set up in a storage resource of a management server 21. For example, the settings for a node ID, node name, node type, and the own node port name and adjacent port name are registered in a node management table 47 for each node. As node types, for example, there is "HOST", which indicates that the node is a host; "FCSW", which indicates it is an FC switch; and "STRS", which indicates it is a storage system. The own node port name is a port name of a port mounted to each own node (e.g. when own node is "host 0", the own node ports are "port 0" and "port 1"), and the adjacent port name is the port name of a port of a separate node adjacent to the node port.

This node management table 47 can be prepared in advance, and can be constructed by virtue of the SAN management software 31 collecting information from each node. More specifically, for example, each node 1, 33 and 3 stores information comprising the own node port name and the adjacent port name, and by virtue of the SAN management software 31, for example, accessing a prescribed application program interface of the respective nodes 1, 33 and 3, and requesting discovery, as shown in FIG. 4A, makes it possible to collect information comprising the own node port name and the adjacent port name of that node for each of the nodes 1, 33 and 3, and to use the collected information to construct the above-mentioned node management table 47. That is, in FIG. 4A, either all or a part of table portion 47A is information collected from "host 0", either all or part of table portion 47B is information collected from "FC switch 1", either all or part of table portion 47C is information collected from "FC switch 2", and either all or part of table portion 47D is information collected from "storage system 3".

FIG. 4B shows an example of the constitution of a storage internal-path management table.

A storage internal-path management table 49 is a table for managing a storage internal-path. The storage internal-path management table 49, for example, is prepared for a storage resource (for example, a shared memory 140) of "storage system 3". For example, a port name, the respective host group IDs belonging to this port, the respective LUN belonging to these host group IDs, and the LDEV number belonging to these LUN are registered in the storage internal-path management table 49 for each port of "storage system 3".

Figures 5A, 5B, 5C:
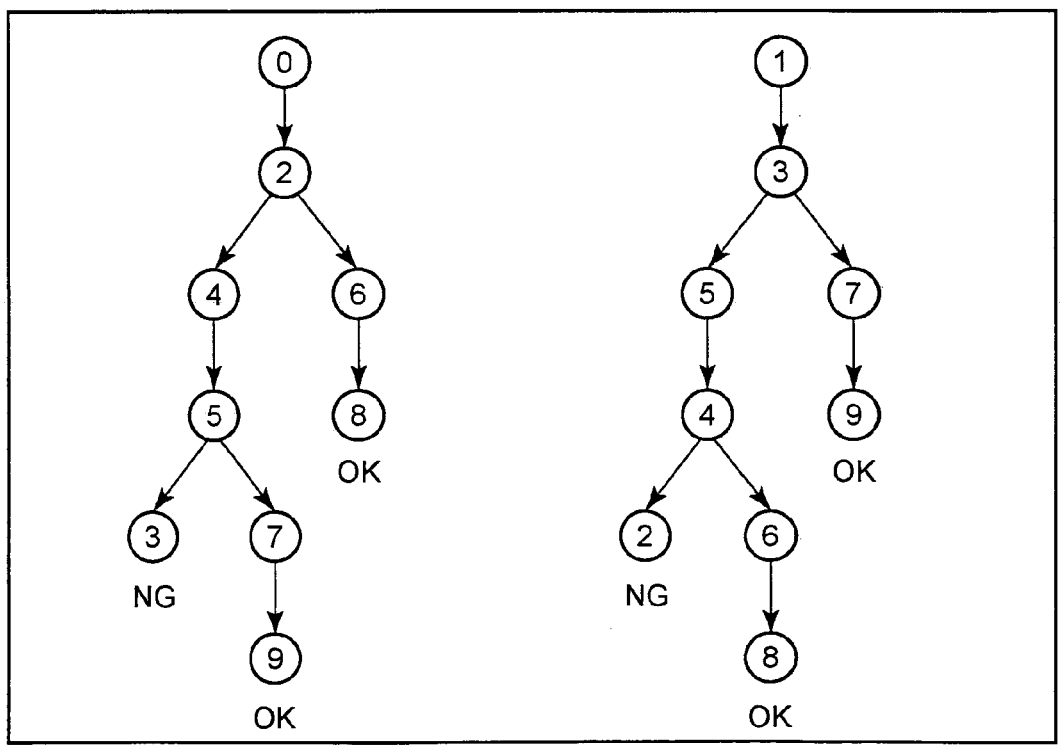
FIG. 5A shows an example of a constitution of an alternate path management table maintained by "host 0"
FIG. 5B shows an example of a constitution of an alternate path management table maintained by a management server 21.
FIG. 5C is an illustration of an example of a method whereby a SAN management software program 31 detects a physical path by analyzing a node management table 47.

FIG. 5A shows an example of a constitution of an alternate path management table.

An alternate path management table 51 is a table for managing an alternate path. An alternate path management table 51, for example, is set up in a storage resource (for example, an HDD 13) of "host 0". For example, a volume name of an in-node volume, the IDs of the respective alternate paths belonging to the in-node volume, a host port name, a storage port name, and LDEV number are registered in an alternate path management table 51. An in-node volume constitutes a kind of route directory, and, more specifically, for example, is a volume that exists inside "host 0" (for example, a volume corresponding to one hard disk drive). A host port name is a port name of a port mounted in "host 0". A storage port name is a port name of a port mounted in "storage system 3".

There are cases in which the alternate path management table 51 is provided to the management server 21 from "host 0" by the SAN management agent 15. When the SAN management software 31 of the management server 21 receives the alternate path management table 51 from "host 0", as shown in FIG. 5B, it can make this table 51 into a new alternate path management table 53 by adding to the alternate path management table 51 the node name "host 0" of "host 0", which recognizes an alternate path managed by this table 51. The SAN management software 31 can manage an alternate path recognized by "host 0" by storing this new alternate path management table 53 in a storage resource inside the management server 21.

The preceding has been explanations of the node management table 47, storage internal-path management table 49, and alternate path management table 51.

The SAN management software 31 inside the management server 21 can detect a physical path that exists between "host 0" and "storage system 3" by analyzing the node management table 47. FIG. 5C shows an example of the way this analysis is carried out (Furthermore, the numbers inside the respective circles on FIG. 5C (for example, "0") indicate the numeral for each port name (for example, the "0" in the port name "port 0").

That is, for example, in addition to the own node port name of "host 0", the SAN management software 31 specifies the adjacent port name corresponding to this own node port name, and subsequently repeats the following processes (1) and (2).

(1) Specifies the same own node port name as the specified adjacent port name; and (2) Specifies the adjacent port name corresponding to this specified own node port name.

As a result of this, if the SAN management software 31 can specify down to a port name of "storage system 3", the search is OK, and a physical path, which can be represented by the plurality of port names specified in the process up to the specifying of this port name, is detected. However, if a port name of "storage system 3" cannot be specified as a result of repeating the processing of the above-mentioned (1) and (2), and, for example, this processing returns from a port name of "FC switch 1" to a port name of "host 0", the search is NG, and a physical path is not detected.

In accordance with the above-mentioned processing, the above-mentioned four physical paths between "host 0" and "storage system 3" are detected by the SAN management software 31 as illustrated in FIG. 5C.

The SAN management software 31 can create a physical path management table representing the results of this search, and can store the created physical path management table in a storage resource of the management server 21 (for example, an HDD 29). More specifically, for example, as illustrated in FIG. 6A, it can create a physical path management table 55 disclosing the physical path ID and information representing this physical path (that is, the combination of port names from "host 0" to "storage system 3") for each detected physical path, and store this table 55 in a storage resource of the management server 21.

Further, although not shown in the figure, the SAN management software 31 can receive a storage internal-path management table 49 from "storage system 3" (for example, from the SVP 281), and can specify a storage internal-path in "storage system 3" by adding the node name "storage system 3" to this table 49. The SAN management software 31 can build an integrated path by mutually associating a specified storage internal-path, the above-mentioned detected physical path, and an alternate path registered in the alternate path management table 53. What is referred to here as an "integrated path" is a path in which a physical path, alternate path and storage internal-path are integrated, and is a series of routes from "host 0" to LDEV [100] inside "storage system 3".

Figures 6A, 6B:
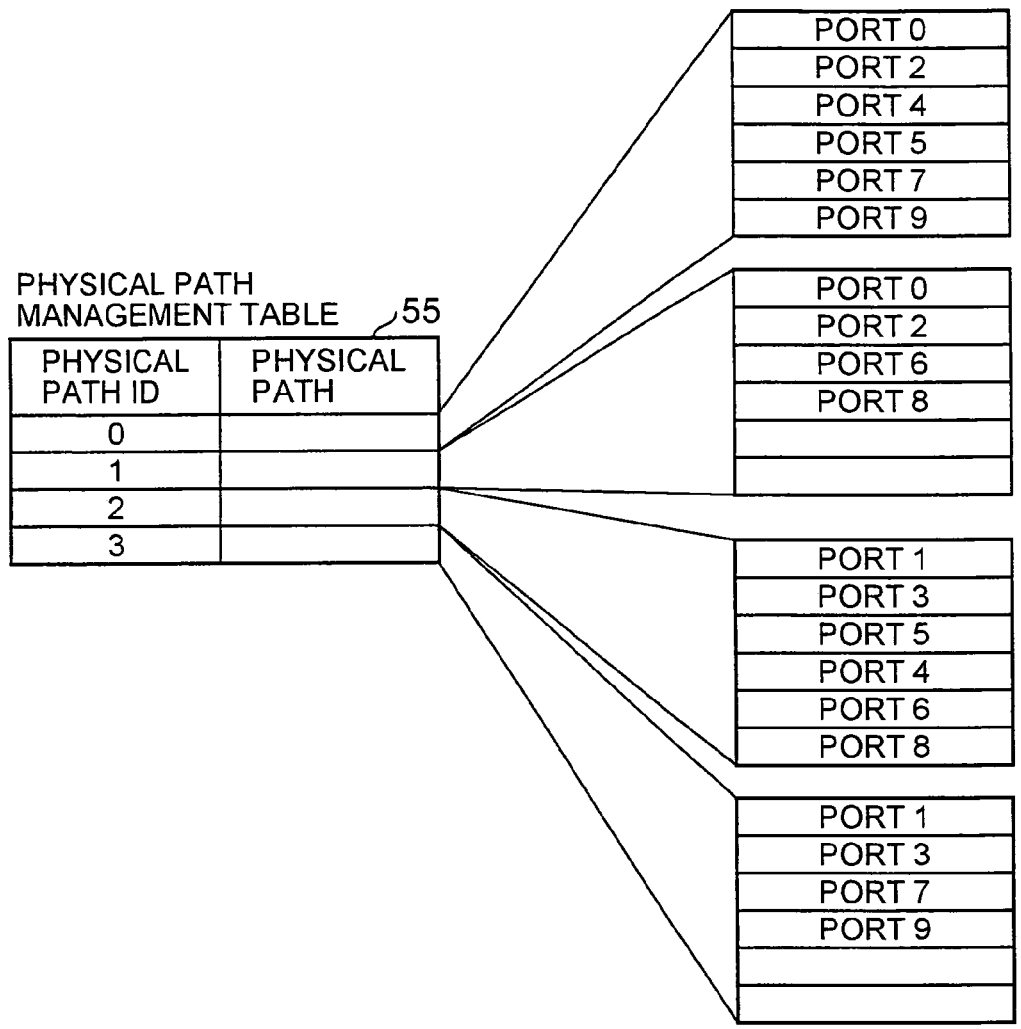
FIG. 6A shows an example of a constitution of a physical path management table.
FIG. 6B shows an example of a constitution of an integrated path management table.

FIG. 6B shows an example of the constitution of an integrated path management table.

For example, a node name, in-node volume name, alternate path ID, physical path ID, host group ID, LUN and LDEV number are registered in an integrated path management table 57. That is, in accordance with this table 57, an alternate path ID is made to correspond to a physical path ID, in other words, an alternate path is mapped to a physical path. Then, the parts (host group ID, LUN and LDEV number), which are not comprised in at least the physical path and alternate path of the storage internal-path, are made to correspond to the physical path ID and alternate path ID combination (group).

The SAN management software 31 can build an integrated path management table 57 like this, and store this integrated path management table 57 in a storage resource of the management server 21 (for example, an HDD 29). Further, the SAN management software 31 can also display, based on at least one of the various tables 47, 49, 53 and 57, at least the physical path of the integrated path from "host 0" to an LDEV [100] of "storage system 3" on a display device (for example, a display screen) 26 of the management server 21, and can also display the alternate path mapped to this physical path by superimposing it on the display of this physical path. Furthermore, when it detects that trouble has occurred in a port 35 of a certain FC switch 33, the SAN management software 31, for example, can also display on a display device 26 which port 35 is malfunctioning, and which alternate path is incapable of being used because of the malfunctioning of this port 35. Further, when the SAN management software 31 specifies an alternate path as unusable, at a prescribed timing (for example, immediately following specification), it can notify a host, which recognizes the unusable alternate path, of the fact that this alternate path has become unusable.

The flow of processing carried out by this embodiment will be explained hereinbelow.

FIGS. 7 and 8 show an example of the flow of an integrated path building process.

The SAN management software 31 acquires an alternate path management table 53 from a storage resource of the management server 21 (Step S21). This is the table, which the SAN management software 31 received previously as alternate path management table 51 (refer to FIG. 5A) from the SAN management agent 15 of "host 0", made it into alternate path management table 53 (refer to FIG. 5B), and stored it in a storage resource of the management server 21.

The SAN management software 31 acquires a storage internal-path management table 49 (S22). Here, for example, the SAN management software 31, by issuing a prescribed request to a not-shown SAN management agent inside an SVP 281 of "storage system 3", can receive from this SAN management agent a storage internal-path management table 49, which was read out from a shared memory 140 of "storage system 3".

The SAN management software 31 specifies a host (for example, "host 0"), which will be the target of mapping execution (S23). More specifically, for example, the SAN management software 31 selects an arbitrary node name (for example, node name "host 0") from the acquired alternate path management table 53.

The SAN management software 31 commences an integrated path building process (the processes of S25 through S30) for the specified host.

For example, first, the SAN management software 31 specifies, for example, either an arbitrary, or manager-specified in-node volume name (S25), references the alternate path management table 53, and specifies, from among one or more alternate paths corresponding to the specified host, the alternate path ID of the alternate path having the specified in-node volume name (S26).

Next, the SAN management software 31 retrieves from the physical path management table 55 a physical path ID of the physical path having the host port name comprising the alternate path of the alternate path ID specified in S26 (S27). Further, the SAN management software 31 retrieves from the physical path management table 55 the physical path ID of the physical path having the storage port name comprising the alternate path of the alternate path ID specified in S26 (S28).

Then, the SAN management software 31 maps the alternate path ID specified in S26 and the physical path ID specified in both S27 and S28 (that is, the IDs of the physical path, which treats the host port name and storage port name comprising the alternate path of the alternate path ID specified in S26, as a start point and end point, respectively) into an integrated path management table 57 (S29). Further, at this point in time (or at an appropriate time thereafter), for example, the SAN management software 31 can specify from the alternate path management table 53 the host node name and in-node volume name specified in S23, and make the specified node name and in-node volume name correspond to the alternate path ID and physical path ID combination, which was made correspondent in S29.

Next, the SAN management software 31 executes processing for mapping a storage internal-path for the combination of an alternate path and a physical path, which were made to correspond to one another (S30). The detailed process flow for this processing will be explained below by referring to FIG. 9.

The SAN management software 31 retrieves from the storage internal-path management table 49 a storage internal-path, which has the storage port name comprising the alternate path of the alternate path ID specified in S26 of FIG. 7 (S30-1).

Further, the SAN management software 31 specifies from the node management table 47 the node ID corresponding to a host node name comprising the alternate path of the alternate path ID specified in S26 of FIG. 7, and retrieves from the storage internal-path management table 49 (or one or more of the storage internal-paths retrieved in S30-1) a storage internal-path having the host group ID corresponding to this node ID (S30-2).

Furthermore, the SAN management software 31 retrieves from the storage internal-path management table 49 (or one or more of the storage internal-paths retrieved in both S30-1 and S30-2) a storage internal-path, which comprises the LDEV number comprising the alternate path of the alternate path ID specified in S26 of FIG. 7 (S30-3).

Then, the SAN management software 31 corresponds prescribed information (that is, the host group ID, LUN and LDEV number) comprising the storage internal-paths retrieved in all of steps S30-1 through S30-3 to the combination of an alternate path ID and a physical path ID mapped in S29 of FIG. 8 (S30-4).

In accordance with the above-mentioned S30-1 through S30-4, processing for mapping a storage internal-path to the combination of an alternate path and a physical path, which have been made to correspond to one another, is completed.

Thereafter, as shown in FIG. 8, the SAN management software 31 determines whether or not there is an unspecified LDEV number for an LDEV, which the host specified in S23 of FIG. 7 recognizes, and if there is (S31: YES), it carries on S25 of FIG. 7, and if there is not (S31: NO), it carries out S32 of FIG. 8. The presence or absence of an unspecified LDEV number, for example, can be determined as follows. That is, when a host has been specified, the SAN management software 31 can determine the presence of an unspecified LDEV number by specifying from the alternate path management table 53 all the LDEV numbers, which this host recognizes, and writing them out to a prescribed storage area, and when an LDEV number is specified, setting a flag for this LDEV number, and thereafter determining the presence or absence of a flag for each written out LDEV number.

When S31 is NO, the SAN management software 31 determines the presence or absence of an unspecified host, and if there is an unspecified host (S32: YES), carries out S23 of FIG. 7, and if there is not (S32: NO), ends this integrated path building process. The presence of an unspecified host, for example, can be determined as follows. That is, when the SAN management software 31 has specified a host, it can determine the presence of an unspecified host by setting a flag for the node name of this host in the alternate path management table 53, and thereafter, determining the presence or absence of a flag for each node name of the alternate path management table 53.

In accordance with the above-mentioned integrated path building process, it is possible to register an integrated path for each host 1 on the integrated path management table 57. That is, the integrated path management table 57 can be completed.

Thereafter, the SAN management software 31, based on information recorded in this integrated path management table 57, can display which alternate path exists on which integrated path in a mode, which is easy for a manager to understand. An example of the flow of processing carried out at this time will be explained below.

Figure 10:
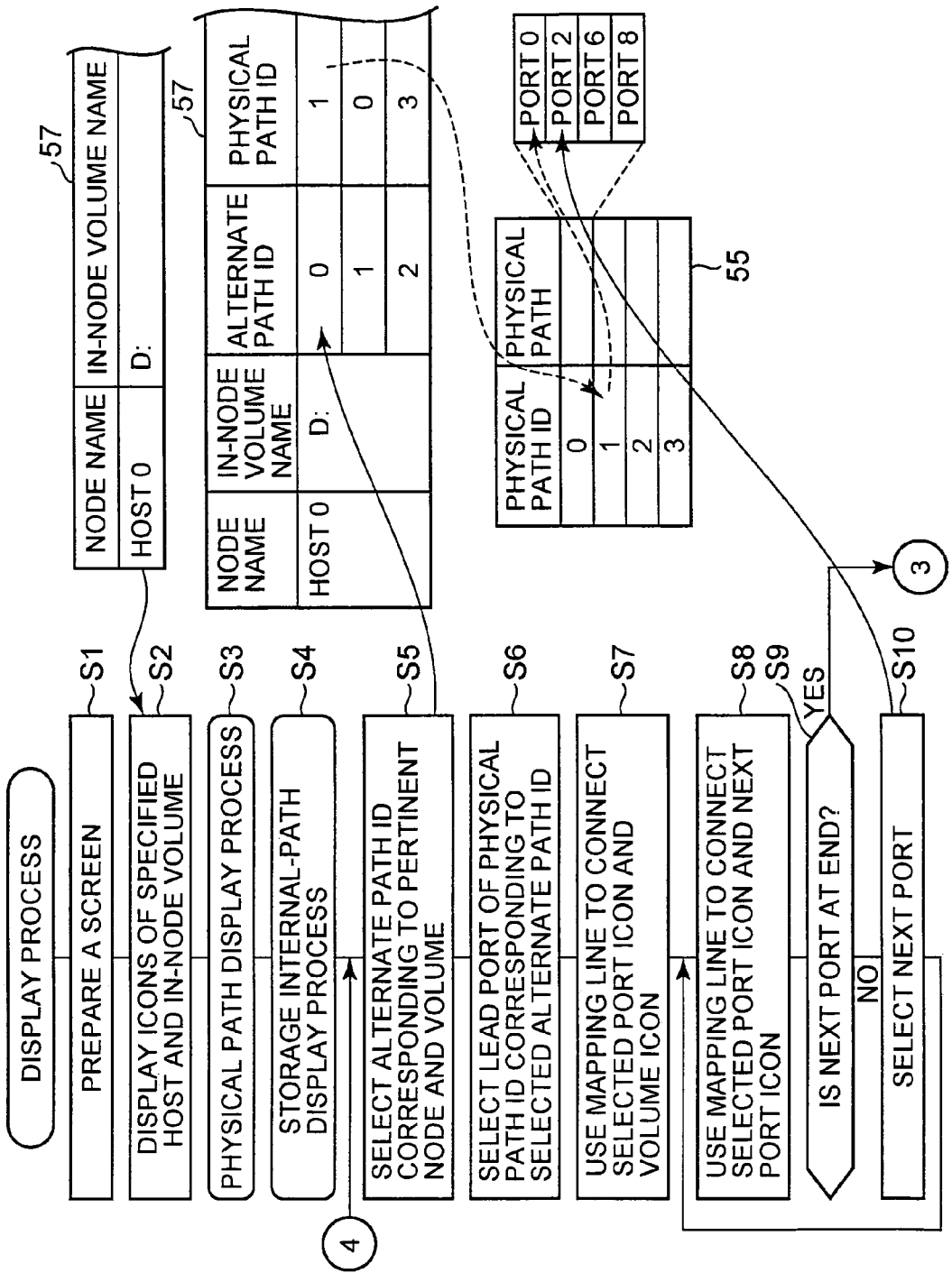
FIG. 10 shows one part of an example of the flow of alternate path display processing.
Figure 11:
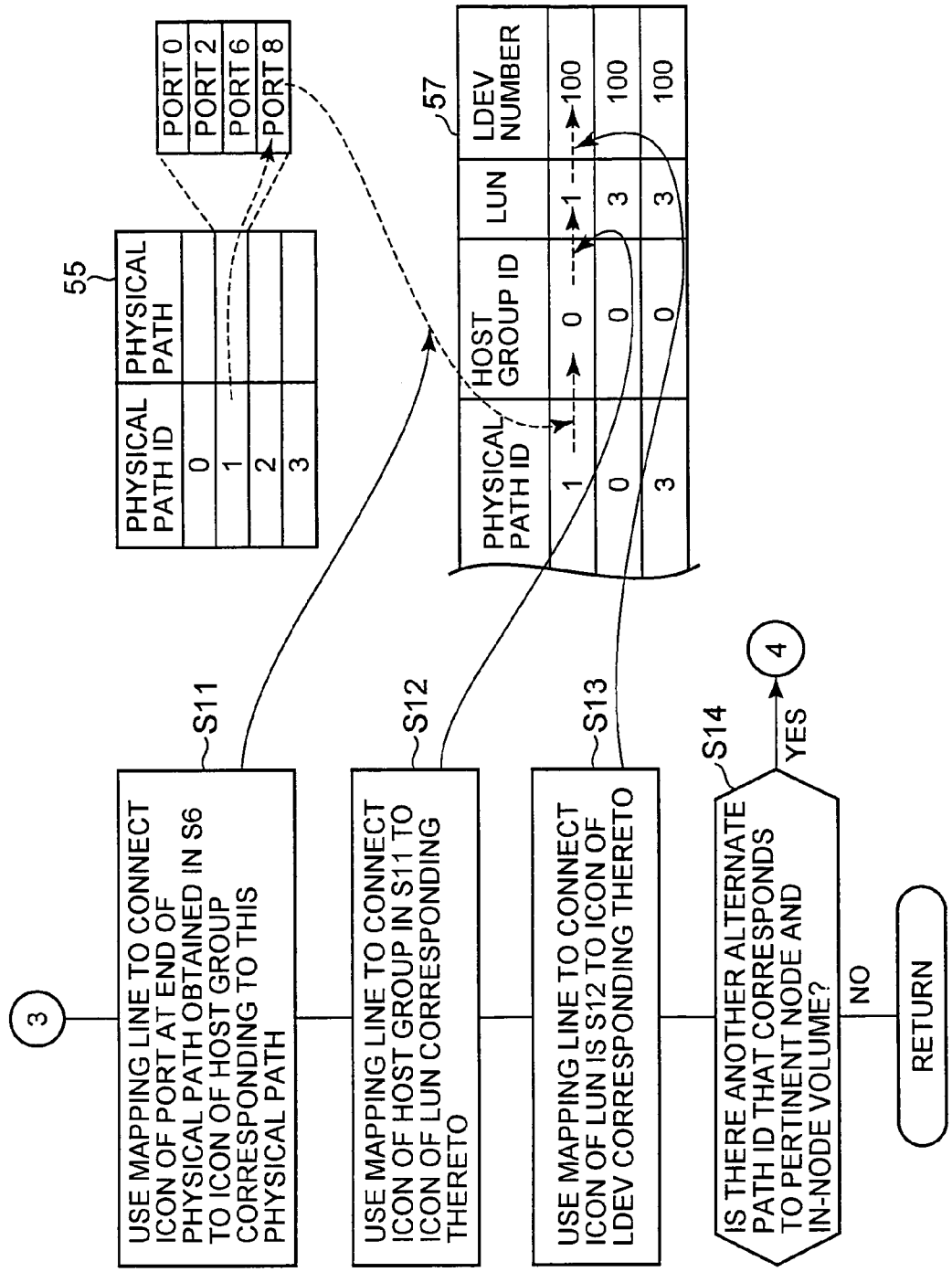
FIG. 11 shows the remaining part of an example of the flow of alternate path display processing.

FIGS. 10 and 11 show an example of the flow of alternate path display processing.

The SAN management software 31, in response to a request from a manager, for example, prepares a screen (for example, a window or other such GUI screen), and displays the prepared screen on a display device 26 (S1). Then, the SAN management software 31, for example, specifies one node name (in other words, a host name) from among one or more node names recorded in the integrated path management table 57, and displays on the screen prepared in S1 (hereinafter, the prepared screen) the icons of the node having the specified node name, and the in-node volume having the in-node volume name corresponding to the specified node name (S2). Furthermore, here, for example, the SAN management software 31 can display a screen, on which one or more node names and in-node volume names recorded in the integrated path management table 57 are displayed in a selectable condition, and can specify a node name and in-node volume name selected by a manager. Further, the SAN management software 31 can receive the input of a node name and in-node volume name from a manager, and can specify the inputted node name and in-node volume name.

Next, the SAN management software 31 executes physical path display processing (in other words, processing for displaying the topology between a host and storage) (S3). As a result of this, for example, in the case of node name "host 0", a physical path is displayed in a prepared screen in the mode illustrated in FIG. 17A. According to the example of FIG. 17A, for example, a node name (for example host 0) is displayed in the icon of a node (for example, a host), and a port name (for example, port 0) is displayed in the icon of a port.

Figure 17A:
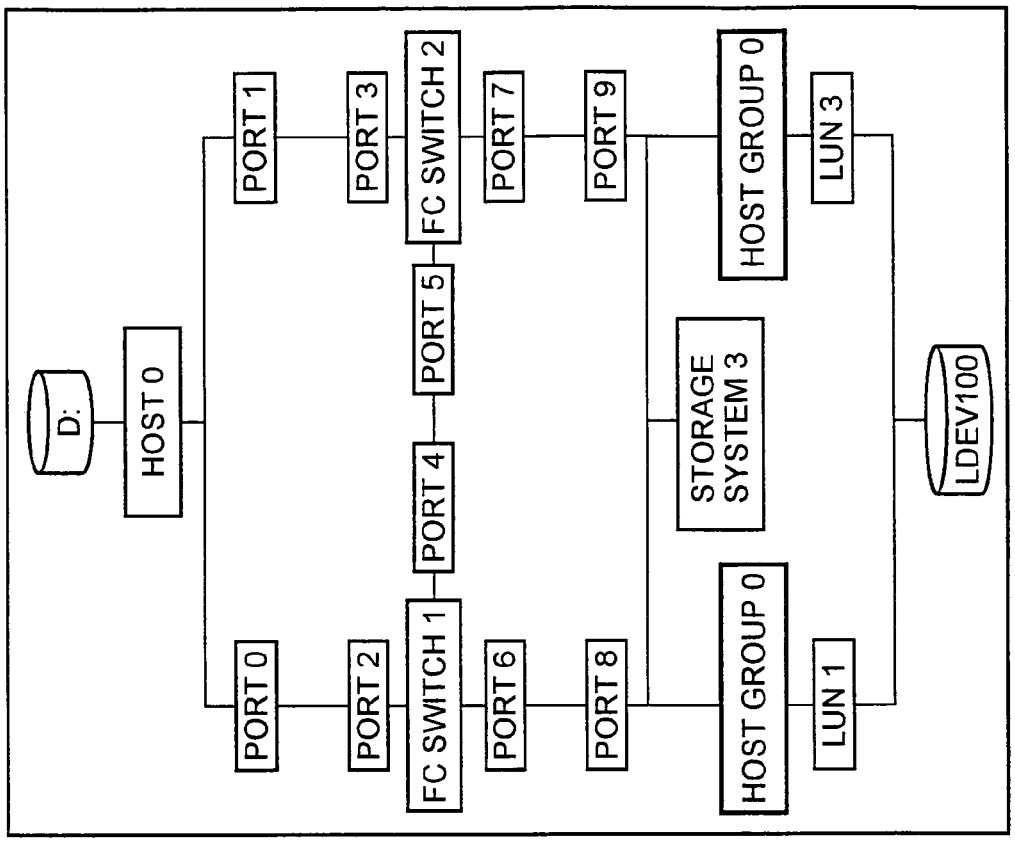
FIG. 17A shows an example of a prepared screen on which a physical path is displayed by physical path display processing.
Figure 17B:
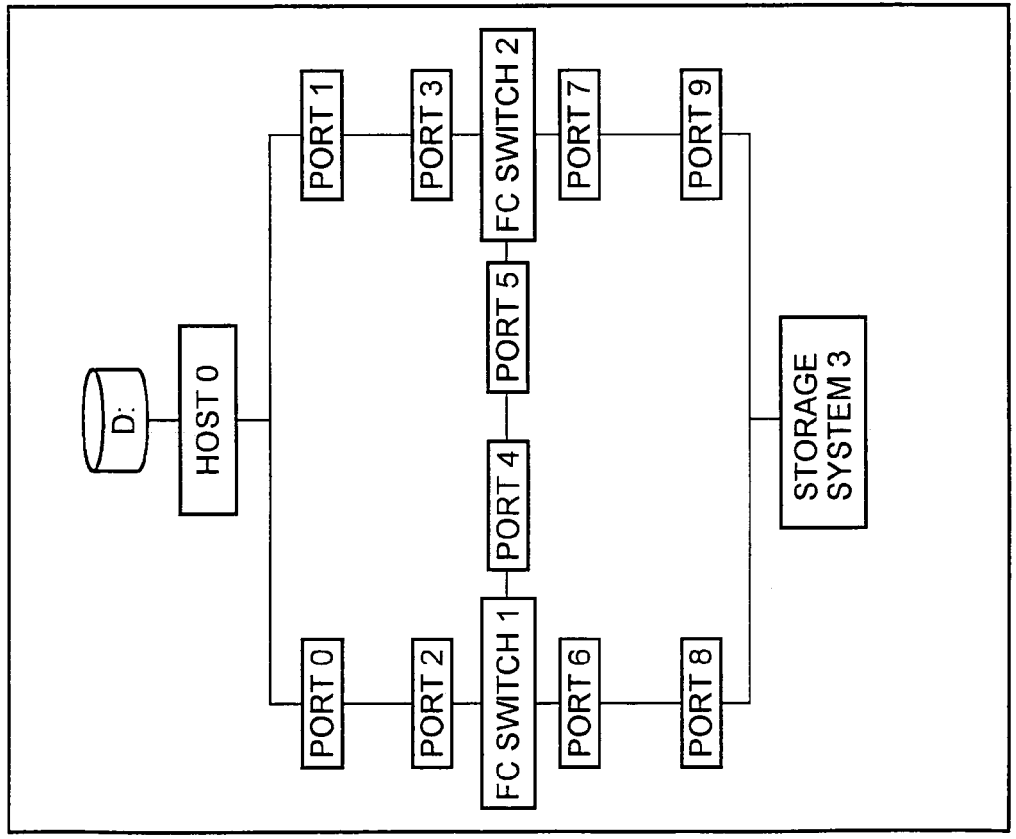
FIG. 17B shows an example of a prepared screen on which a storage internal-path linked to a physical path is displayed by storage internal-path display processing subsequent thereto.

Next, the SAN management software 31 executes storage internal-path display processing (S4). As a result of this, for example, when the LDEV is LDEV [100], a storage internal-path, which is linked to the end of the physical path displayed in FIG. 17A, is displayed in a prepared screen as illustrated in FIG. 17B. In this display mode, similar to the display mode of the physical path, the icon of each component of a storage internal-path (for example, a host group) is displayed, and the type and ID of this component (for example, host group 0) is displayed in this icon.

Next, the SAN management software 31 specifies from the integrated path management table 57 one or more alternate path IDs corresponding to the host and in-node volume displayed in S2, and selects one alternate path ID from among the one or more alternate path IDs specified (S5).

Next, the SAN management software 31 specifies from the integrated path management table 57 the physical path ID corresponding to the alternate path ID selected in S5, specifies from the physical path management table 55 the physical path corresponding to the specified physical path ID, and selects a lead port (in other words, a port mounted in the host) from among the plurality of ports constituting this physical path (S6).

Next, the SAN management software 31 uses a mapping line to connect the icon of the selected port and the icon of the in-node volume in the prepared screen on which the physical path and storage internal-path are displayed (S7). In other words, the SAN management software 31 plots a mapping line connecting the respective icons on the prepared screen. Here, a mapping line is a line, which is displayed in a different mode than the line used on the display of a physical path and storage internal-path. As specific examples of how the line display mode differs, the line can be a different thickness, pattern, type (for example, a solid line, dotted line, and so forth), or color. In this embodiment, the thickness of the line differs. More specifically, the mapping line is thicker than the lines used in the physical path and storage internal-path displays.

Now then, next the SAN management software 31 uses a mapping line to connect the selected port icon to the icon of the next port (S8). The "next port" is the port immediately following the selected port in the physical path specified in S6.

When the "next port" in S8 is not the port at the end of the physical path specified in S6 (that is, a port mounted in the storage system) (S9: NO), the SAN management software 31 selects the port subsequent to that (S10), and once again executes S8. Conversely, when the "next port" in S8 is the port at the end of the physical path specified in S6 (S9: YES), the SAN management software 31 carries out the processing of S11 of FIG. 11.

That is, the SAN management software 31 uses a mapping line to connect the icon of the port at the end of the physical path specified in S6 of FIG. 10 to the icon of the host group corresponding to this physical path (S11). Further, the SAN management software 31 uses a mapping line to connect the icon of the host group in S11 to the icon of the LUN corresponding thereto (S12). In addition, the SAN management software 31 uses a mapping line to connect the icon of the LUN in S12 to the icon of the LDEV corresponding thereto (S13). In accordance with finishing this S13 processing, a single alternate path, which is displayed using a mapping line, is superimposed on top of the picture of the physical path and storage internal-path in the prepared screen on which the physical path and storage internal-path are displayed (Refer to FIG. 17B).

The SAN management software 31 determines whether or not there is another alternate path ID corresponding to the node and in-node volume in S2 by referencing the integrated path management table 57, and when none exists (S14: NO), it returns (for example, it returns once again to S1), and when there is another alternate path ID (S14: YES), by once again carrying out the processing of S5 and beyond on FIG. 10, it displays another alternate path on the above-mentioned prepared screen, on which at least one alternate path is being displayed.

Figure 18A:
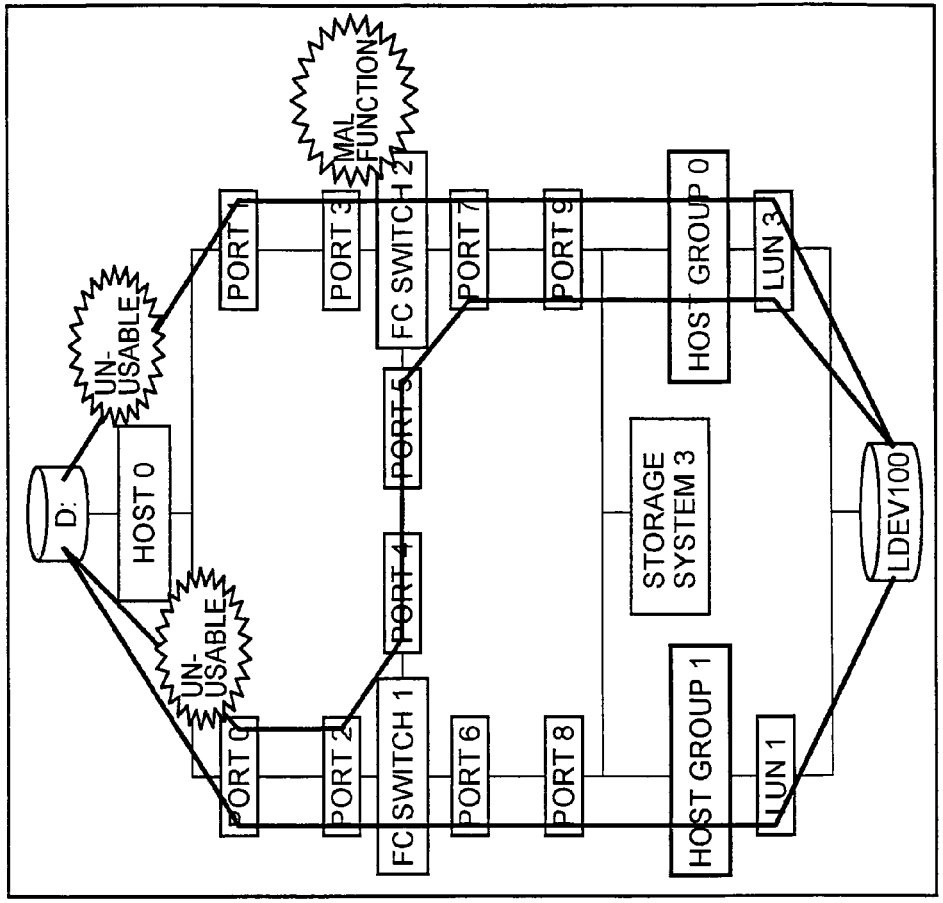
FIG. 18A shows an example of a prepared screen on which an alternate path is displayed overlapping the displays of a physical path and a storage internal-path.

When S14 is NO, the processing for displaying in a superimposed condition all of a plurality of alternate paths to the same LDEV on the physical path and storage internal-path for a certain host and in-node volume, is completed. As a result of this, as illustrated in FIG. 18A, a plurality of alternate paths, which are constituted using mapping lines, are displayed on the physical path and storage internal-path on the prepared screen in FIG. 17B. For example, the start point of each alternate path is the icon corresponding to the in-node volume "D:".

The preceding is one example of the flow of alternate path display processing. Next, the physical path display processing (processing of S3 of FIG. 10) and storage internal-path display processing (processing of S4 of FIG. 10), which are carried out in this alternate path display processing, will be explained in detail.

Figure 12:
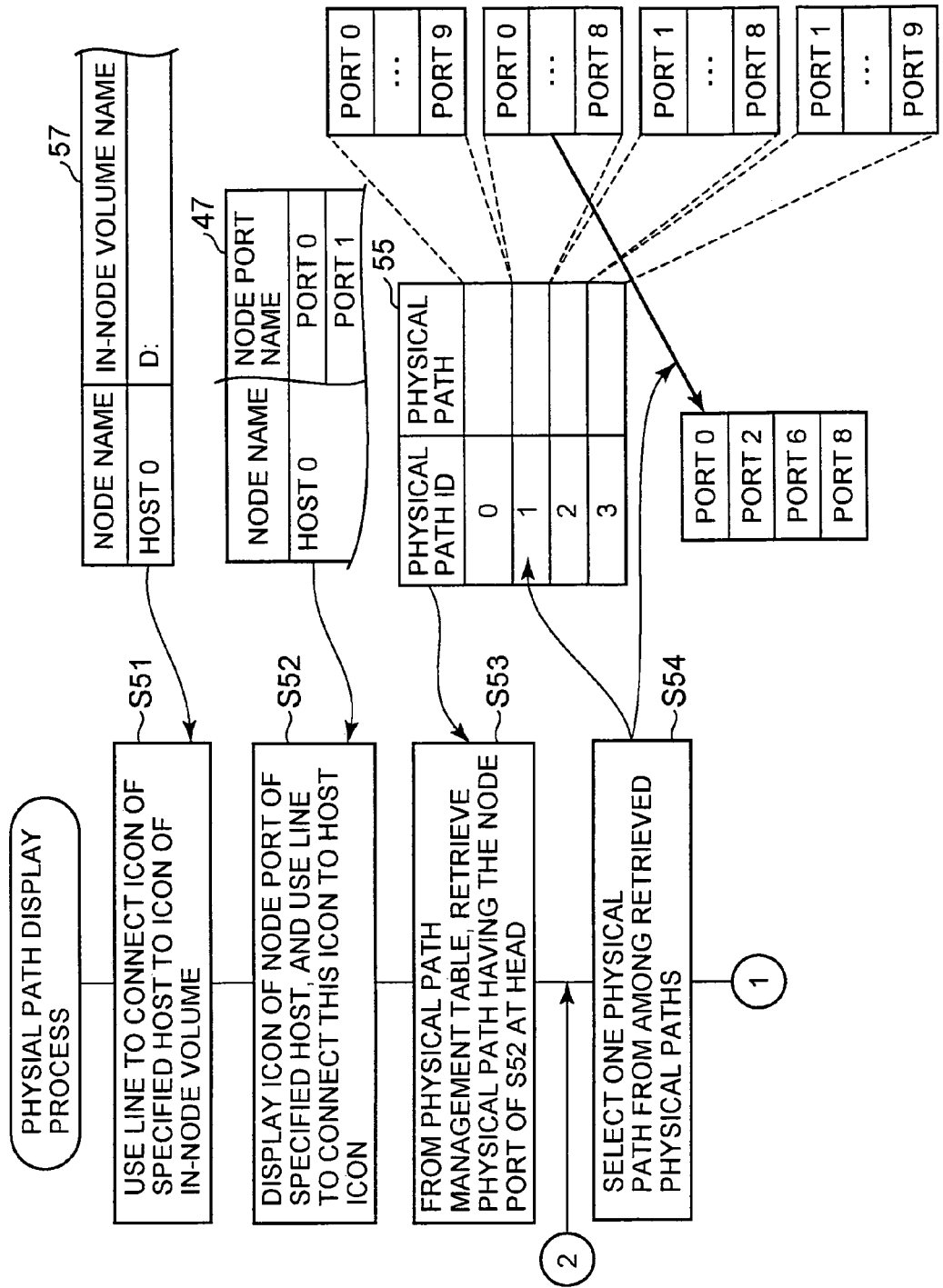
FIG. 12 shows one part of an example of the flow of physical path display processing.
Figure 13:
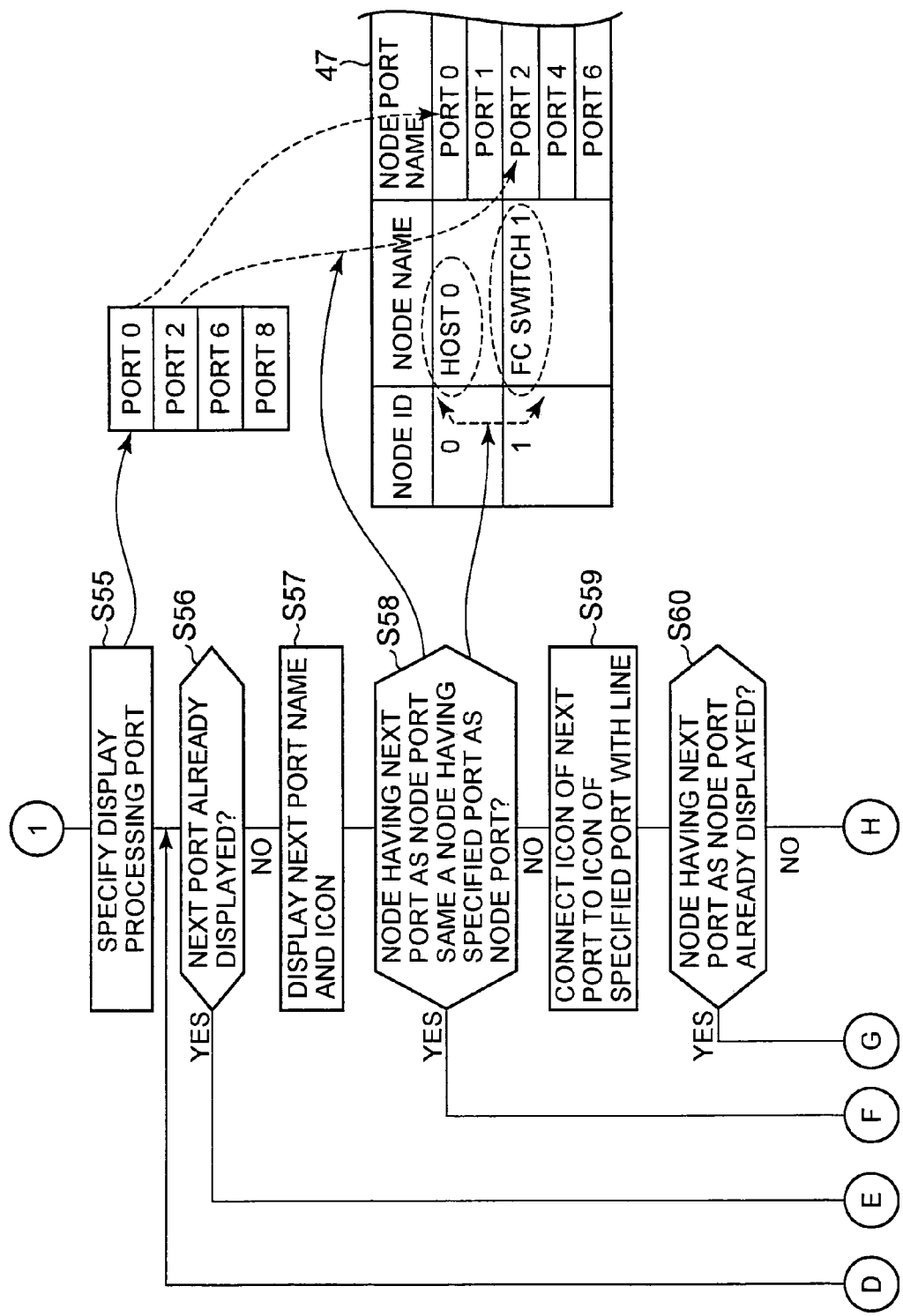
FIG. 13 shows another part of an example of the flow of physical path display processing.
Figure 14:
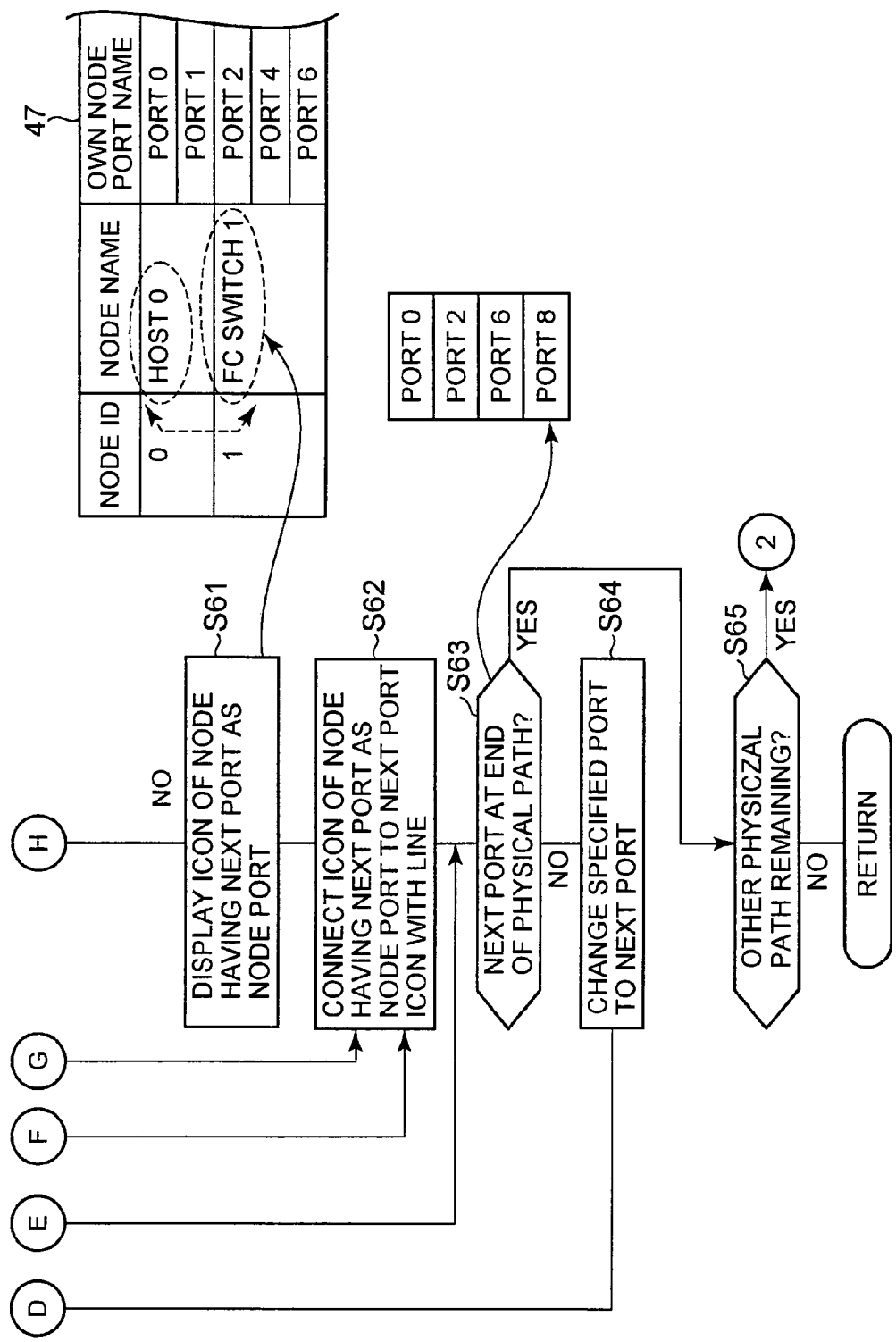
FIG. 14 shows the remaining part of an example of the flow of physical path display processing.

FIGS. 12, 13 and 14 show an example of the flow of physical path display processing.

The SAN management software 31 uses a line to connect the icon of the host specified in S2 of FIG. 10 to the icon of the in-node volume (S51). In other words, the SAN management software 31 plots a line connecting the respective icons on a prepared screen. Here, when referred to simply as a "line", it is a line for which the display mode differs from that of the above-mentioned "mapping line". The line here, for example, is a line that is thinner than the mapping line.

The SAN management software 31 subsequently specifies from the node management table 47 the own node port corresponding to the node name of the host specified in S2, displays the icon of the specified own node port and the port name on a prepared screen, and connects this icon to the icon of the host with a line (S52).

Next, the SAN management software 31 retrieves from the physical path management table a physical path, which has the own node port in S52 as the lead port (S53). More specifically, for example, the SAN management software 31 retrieves from the physical path management table 55 one or more physical paths having the own node port in S52 at the beginning.

The SAN management software 31 selects one physical path from among the one or more physical paths retrieved (S54).

Then, as shown in FIG. 13, the SAN management software 31 specifies a display processing port (that is, a port, which should actually be displayed) from among the plurality of ports constituting the selected physical paths (S55). If the port subsequent to the specified port is already being displayed (S56: YES), the SAN management software 31 carries out the processing of S63 of FIG. 14, but if not (S56: NO), it displays the icon of the next port (S57).

Next, the SAN management software 31, by referencing the node management table 47, determines whether or not the node, which has the next port as the own node port, is the same node, which has the specified port in S55 as the own node port (S58). If it is the same (S58: YES), the SAN management software 31 carries out the processing of S62 of FIG. 14, and if it is different (S58: NO), it uses a line to connect the icon of the next port to the icon of the specified port (S59).

Next, the SAN management software 31 determines whether or not the node having the next port as the own node port is already being displayed (S60), and if it is being displayed (S60: YES), carries out the processing of S62 of FIG. 14, but if it is not being displayed (S60: NO), displays the icon of this node (S61 of FIG. 14).

Next, the SAN management software 31 uses a line to connect the icon of the node having the next port as the own node port to the icon of the next port (S62).

The SAN management software 31 determines whether or not the next port is the port at the end of the selected physical path in S54, and if it is not (S63: NO), makes this next port the specified port (S64), and once again carries out the processing of S56 of FIG. 13. If the next port is the last port (S63: YES), the SAN management software 31 determines whether or not there is an unselected physical path among the one or more physical paths retrieved via the processing of S53 of FIG. 12, and if there is (S65: YES), it carries out the processing of S54 of FIG. 12, but if it is not (S65: NO), it ends this physical path display processing, and concludes S3 of FIG. 10.

Figure 15:
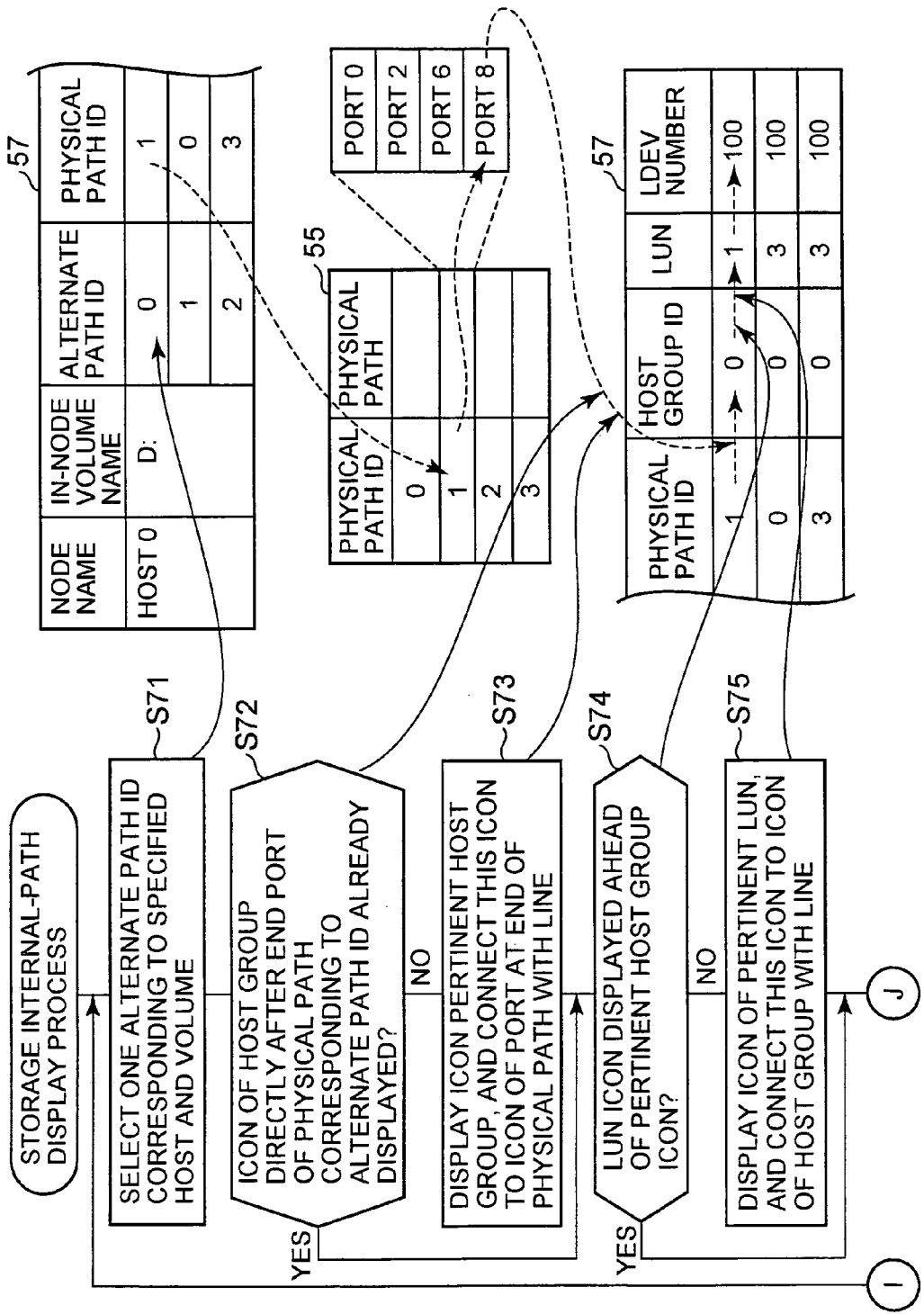
FIG. 15 shows one part of an example of the flow of storage internal-path display processing.
Figure 16:
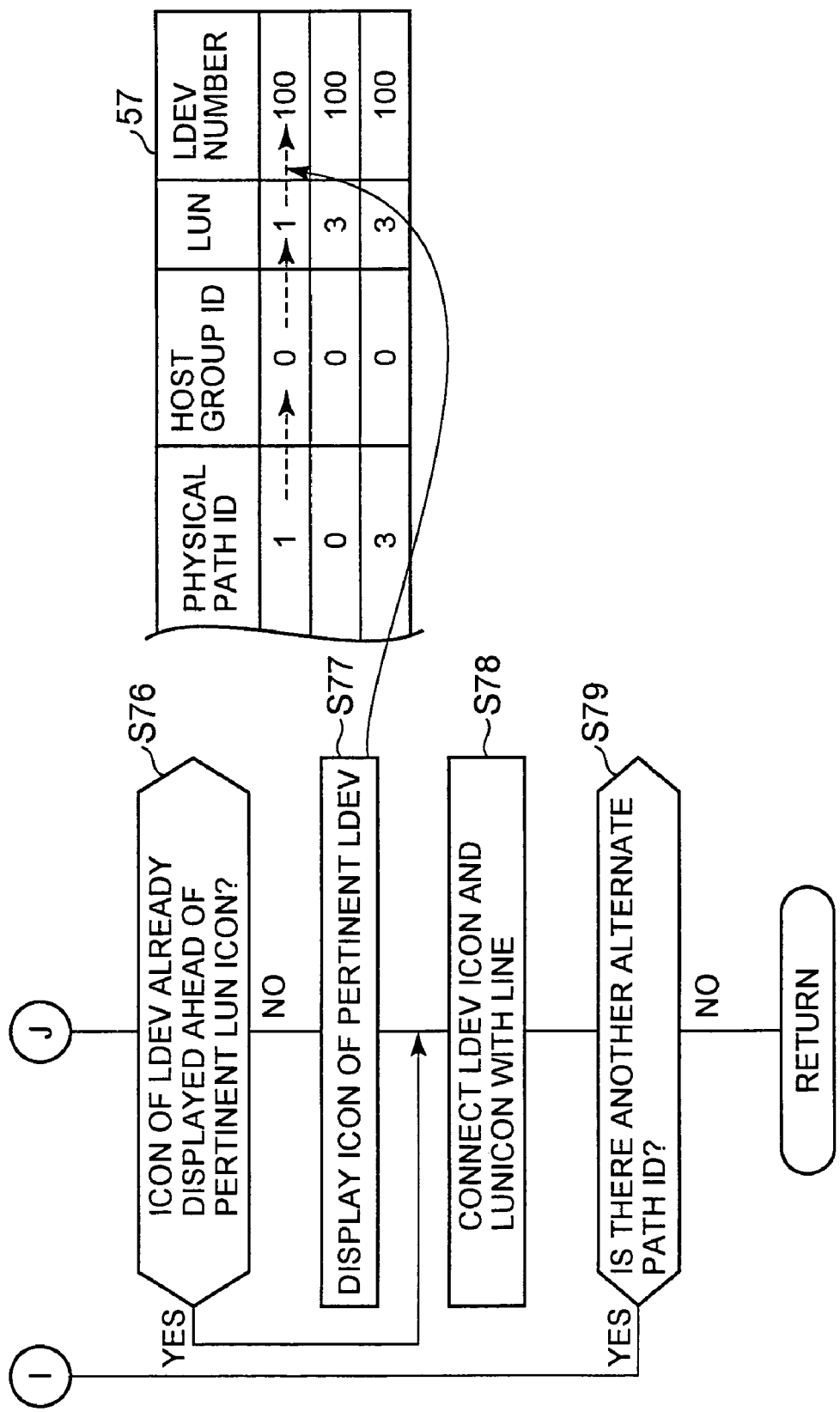
FIG. 16 shows the remaining part of an example of the flow of storage internal-path display processing.

FIGS. 15 and 16 show an example of the flow of storage internal-path display processing.

The SAN management software 31 specifies from within the integrated path management table 57 one or more alternate path IDs corresponding to the host and in-node volume specified in S2 of FIG. 10, and selects one alternate path ID from among the one or more specified alternate path IDs (S71).

Next, the SAN management software 31 specifies from within the integrated path management table 57 a physical path ID corresponding to the selected alternate path ID, specifies from the physical path management table 55 a physical path corresponding to the specified physical path ID, and determines whether or not the icon of a host group is already being displayed ahead of the icon of the last port in the specified physical path (S72).

If the result of the determination of S72 is that a host group icon is being displayed (S72: YES), the SAN management software 31 carries out the processing of S74, and if a host group icon is not being displayed (S72: NO), it carries out the processing of S73. That is, the SAN management software 31 specifies from the integrated path management table 57 a host group ID corresponding to the above-mentioned physical path ID, displays the icon of the host group displaying the specified host group ID, and uses a line to connect this icon to the icon of the last port of the physical path corresponding to the above-mentioned physical path ID (S73).

Next, the SAN management software 31 specifies from the integrated path management table 57 a LUN corresponding to the above-mentioned specified host group, and determines whether or not the icon of the specified LUN is displayed ahead of (for example, directly below) the icon of this host group (S74).

If the result of the determination of S74 is that the specified LUN is displayed (S74: YES), the SAN management software 31 carries out the processing of S74 of FIG. 16, and if the specified LUN is not displayed (S74: NO), it carries out the processing of S75. That is, the SAN management software 31 displays the icon of the above-mentioned specified LUN, and uses a line to connect this icon to the icon of the host group, which comes after (for example, directly above) this (S75).

Next, the SAN management software 31, as shown in FIG. 16, specifies from the integrated path management table 57 an LDEV number corresponding to the above-mentioned specified LUN, and determines whether or not the icon of the LDEV to which the specified LDEV number is allocated is displayed ahead of the icon of the LUN (S76).

If the result of the determination of S76 is that the LDEV is being displayed (S76: YES), the SAN management software 31 carries out the processing of S78, and if the LDEV is not being displayed (S76: NO), it carries out the processing of S77. That is, the SAN management software 31 displays the icon of the LDEV to which the above-mentioned specified LDEV number is allocated (S77), and uses a line to connect this icon to the icon of the LUN, which comes after (for example, directly above) this (S78).

Thereafter, the SAN management software 31 determines whether or not there is an unselected alternate path ID among the one or more alternate path IDs specified in S71 of FIG. 15, and if there is an unselected alternate path ID (S79: YES), it carries out S71 of FIG. 15, and if there is not (S79: NO), it ends this physical path display processing, and concludes S4 of FIG. 10.

Now then, as has already been explained, it is possible to display a prepared screen such as that illustrated in FIG. 18A in accordance with an alternate path display process comprising the above-mentioned physical path display process and storage internal-path display process (the processing shown in FIGS. 10 and 11).

Figure 18B:
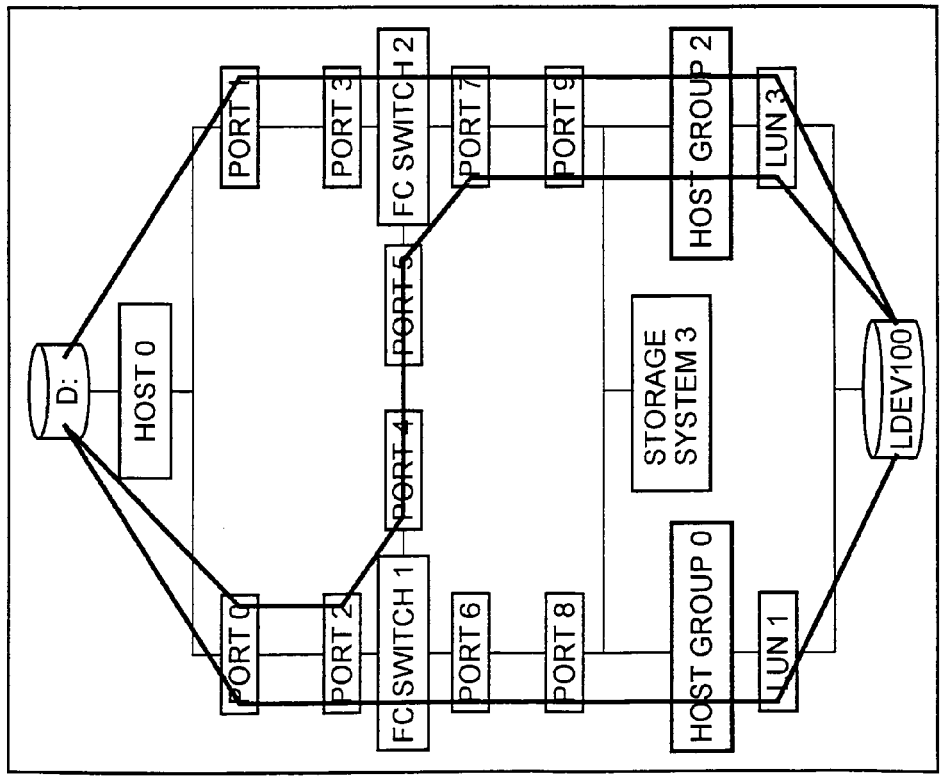
FIG. 18B shows an example of a screen displayed via SAN management software 31 when a malfunction is detected in "FC switch 2"

Further, when the SAN management software 31, for example, detects the occurrence of trouble in a certain node, it can specify the physical path comprising the port to which this malfunctioning node belongs, and can specify the alternate path corresponding to this physical path (that is, the alternate path, which has become unusable). Then, the SAN management software 31 can display on a display device 26 the location of the malfunction, as well as the alternate path that became unusable in line with this malfunction. FIG. 18B shows an example of a screen displayed by the SAN management software 31 when a malfunction is detected in "FC switch 2".

Further, when the SAN management software 31, for example, specifies an unusable alternate path by referencing the integrated path management table 57 and the node management table 47, it can specify, at a prescribed timing (for example, immediately following specification), one or more hosts, which recognize the one or more unusable alternate paths, and can notify the one or more specified hosts that this alternate path has become unusable.

Figure 19:
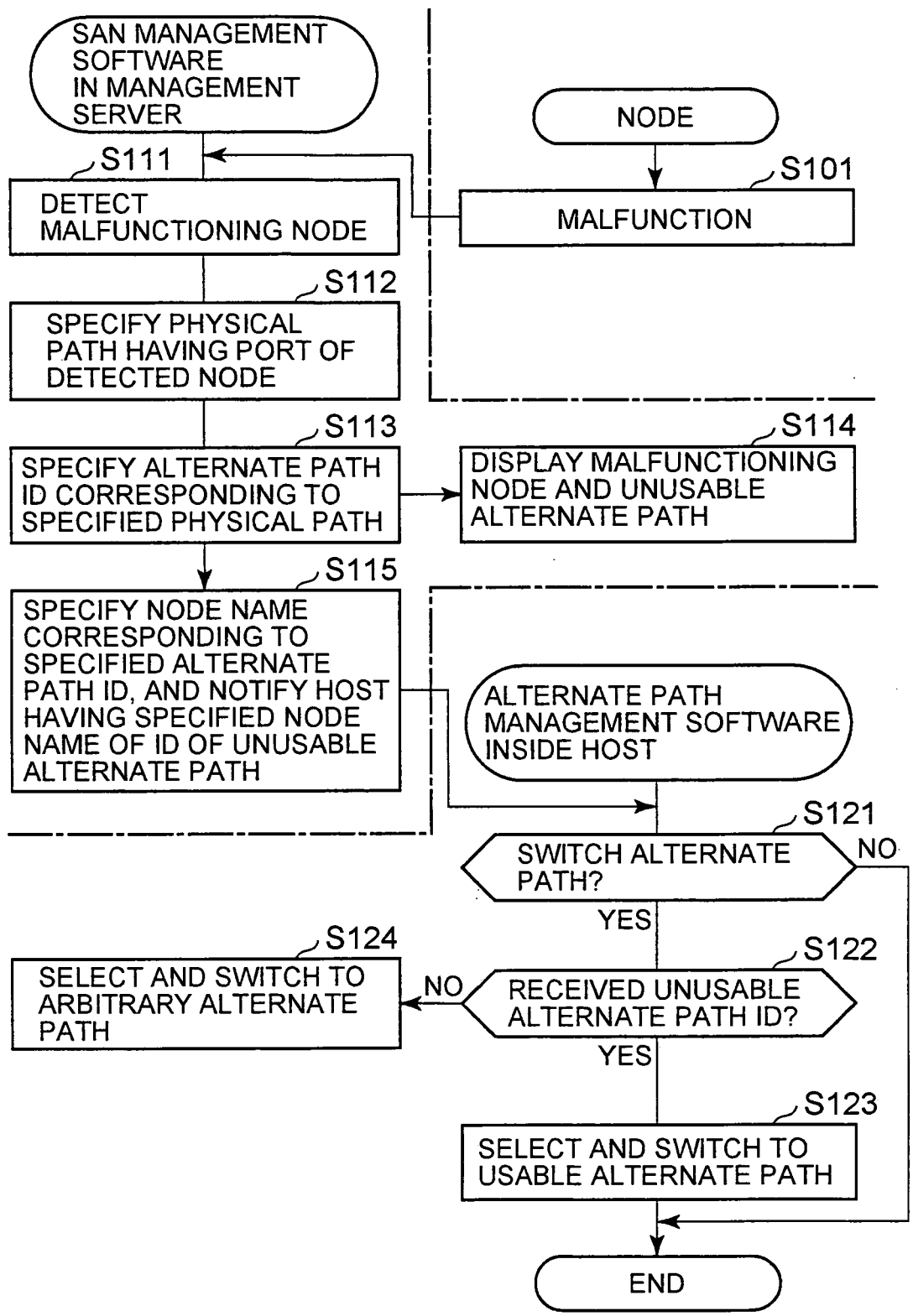
FIG. 19 shows an example of the flow of processing carried out until an unusable alternate path is specified, and an example of the flow of processing carried out subsequent to this alternate path being specified.

FIG. 19 shows an example of the flow of processing carried out until an unusable alternate path is specified, and the flow of processing carried out after this alternate path has been specified.

When a malfunction occurs in a certain node (for example, "FC switch 2") (S101), the SAN management software 31 inside the management server 21 can detect which node has malfunctioned (for example, the fact that the malfunctioning node is the "FC switch 2") (S111). More specifically, for example, the SAN management software 31 can periodically issue a query (for example, a path inspection signal) to the respective nodes registered in the node management table 47, and when a normal response is not returned, can detect the fact that a malfunction has occurred in that node.

The SAN management software 31 can specify the port of the node for which a malfunction was detected by referencing the node management table 47, and can specify the physical path comprising the specified node by referencing the physical path management table 55 (S112). Then, the SAN management software 31 can specify from the integrated path management table 57 the alternate path ID corresponding to the physical path ID of the specified physical path (S113).

The SAN management software 31 can, subsequent to S113, display on a display device 26 which node it was that malfunctioned, and which alternate path is unusable (that is, the alternate path, which was specified in S113) (S114). More specifically, for example, the SAN management software 31, as illustrated in FIG. 18A, indicates on a screen in which an alternate path is displayed in a superimposed condition over a physical path and storage internal-path, either on the icon of the node, in which a malfunction occurred (for example, "FC switch 2"), or in the vicinity thereof, the fact that a malfunction occurred in this node (for example, displays the term "malfunction"), and displays the unusable alternate path in a mode that differs from a usable alternate path (For example, displays the term "unusable" either on this alternate path, or in the vicinity thereof, or displays either the color or the type of line differently). This makes it possible for a manager to rapidly specify where recovery should take place in order for which alternate path to recover.

Further, the SAN management software 31 can specify from the alternate path management table 53 the node name corresponding to the specified alternate path ID at a prescribed timing (for example, immediately) following S113, and can notify the host, which has the specified node name, of the alternate path ID of the unusable alternate path (S115).

The alternate path management software 17 of "host 0" can switch from an in-use alternate path to a separate alternate path at an arbitrary timing. If the alternate path management software 17 switches alternate paths (S121: YES), and the alternate path ID of an unusable alternate path has been received (S122; YES), it makes the switch by selecting the alternate path, which has an alternate path ID other than this alternate path ID (S123), and when an alternate path ID of an unusable alternate path has not been received (S122: NO), it switches over by selecting an arbitrary alternate path (S124). Therefore, in S123, the switch is always made to a usable alternate path, and a switch is not made to an unusable alternate path, but in S124, there are times when the switch is made to an unusable alternate path. In this case, an attempt will be made to access the unusable alternate path, but since this attempt fails because the alternate path is unusable, the alternate path management software 17 can select yet another arbitrary alternate path.

Figure 20A:
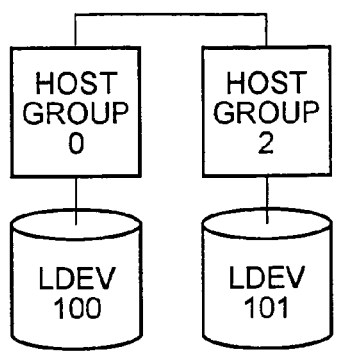
FIG. 20A shows a specific example of making LDEV, for which different LDEV numbers have been assigned, correspond by host group ID.

However, as illustrated in FIG. 20A, a different LDEV number is sometimes made to correspond to each host group ID. More specifically, for example, there are cases in which LDEV [100] is made to correspond to host group ID [0], and LDEV [101] is made correspondent to host group [2]. In this case, for example, when the storage system 3 receives a request from host [0] to access LDEV [100], since LDEV

[100] belongs to host group ID [0], the storage system 3 will permit access to LDEV [100], but when it receives a request from host [0] to access LDEV [101], since LDEV [101] does not belong to host group ID [0], the storage system 3 will not allow access to LDEV [101].

Figure 20B:
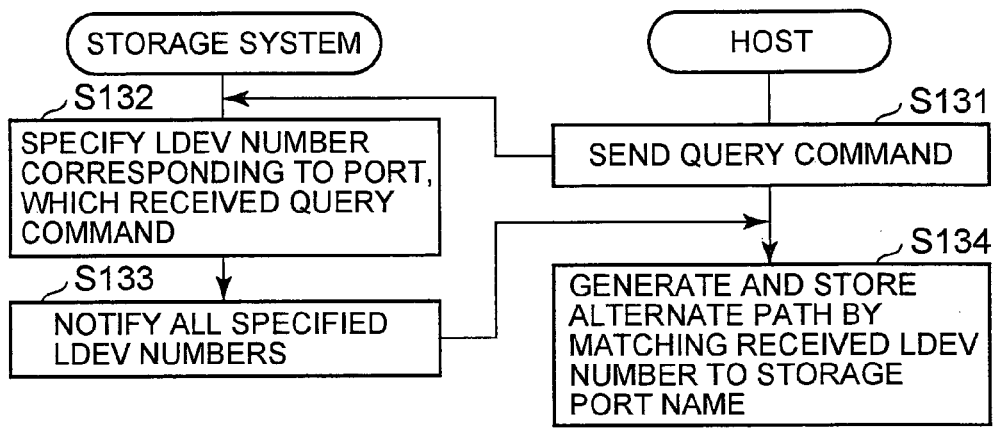
FIG. 20B shows an example of the flow of processing carried out when a host 1 sends a prescribed query command.

Despite this, a host 1 is capable of knowing all the LDEV numbers that belong to storage port names, which it has specified. More specifically, for example, as illustrated in FIG. 20B, the host 1 can send to the storage system 3 a prescribed query command (for example, the Inquiry command stipulated by the SCSI protocol) specifying a desired storage port name (S131). In the storage system 3, the CHA 110, which receives the query command via the port 111 having this storage port name, specifies from the storage internal-path management table 49 the LDEV number belonging to this storage port name (S132), and as a response to this query command, can notify the host 1, which originated the transmission of the query command of all the specified LDEV numbers (S133). This host 1 can make the received LDEV numbers correspond to the query command-specified storage port names in the alternate path management table 51 (S134). This makes it possible for the host 1 to recognize the alternate paths to the LDEVs of all the notified LDEV numbers.

However, just because the host 1 recognizes the alternate paths, this does not mean that it can tell which alternate path to use to access the LDEV at the end thereof. This LDEV must belong to the host group ID corresponding to the access-origin host 1.

Figure 20C:
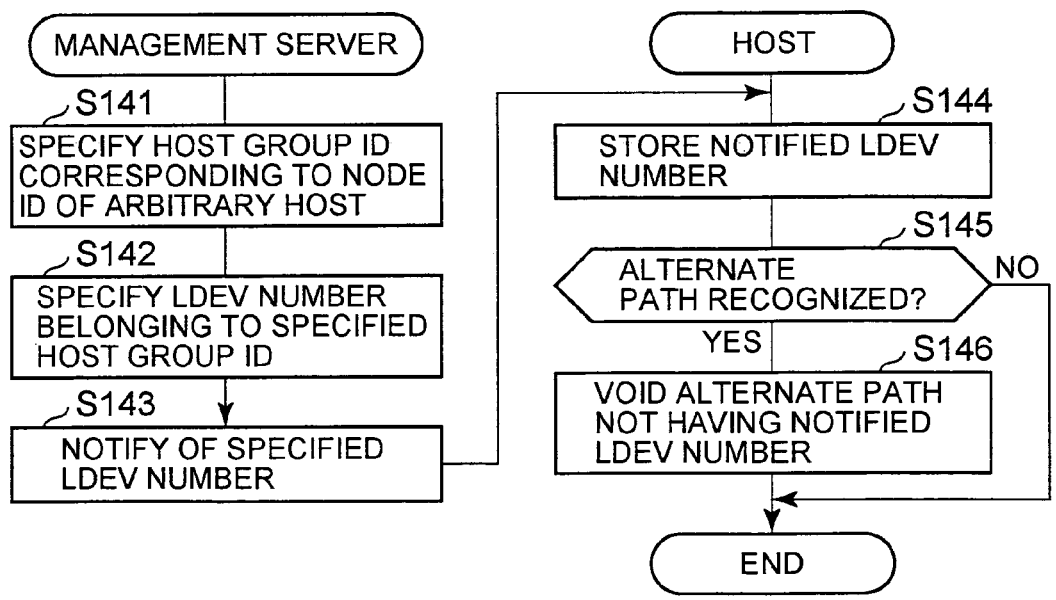
FIG. 20 C shows an example of the flow of processing carried out relative to a host 1 for preventing access to an LDEV, which belongs to a host group ID that does not correspond to the host 1 itself.

Accordingly, the management server 21, by carrying out the following processing, can prevent the host 1 from accessing an LDEV belonging to a host group ID, which does not correspond to itself. An example of the processing flow carried out for this reason will be explained below by referring to FIG. 20C.

The management server 21 (for example, the SAN management software 31) specifies from the integrated path management table 57 the host group ID corresponding to the node name, which corresponds to the node ID of an arbitrary host 1 (S141). The management server 21 specifies from the storage internal-path management table 49 the LDEV number belonging to the specified host group ID (S142). The management server 21 notifies the above-mentioned arbitrary host 1 of all the specified LDEV numbers.

The host, which receives the LDEV number notification, stores the notified LDEV number in its own storage resource (S144). If the host 1, for example, has recognized an alternate path by having carried out S134 of FIG. 20B (S145: YES), it cancels an alternate path, which does not end in the notified LDEV number (S146). More specifically, for example, the host 1 deletes from the alternate path management table 51 the record of an alternate path, which does not have this notified LDEV number.

In accordance with the processing illustrated in this FIG. 20 C, since the host 1 cancels an alternate path to an LDEV belonging to a host group ID, which does not correspond to this host 1, this cancelled alternate path can no longer be used. That is, for example, the alternate path management software 17 will not utilize this cancelled alternate path.

In accordance with the above-mentioned embodiment, which alternate path corresponds to what physical path is detected automatically, and in accordance with this detection result, an alternate path is made to correspond to a physical path. Then, the result of this match-up is displayed. This makes it possible for a manager to specify which alternate path corresponds to what physical path.

Further, in accordance with the above-mentioned embodiment, which physical path between the host 1 and the storage system 3 corresponds to which storage internal-path in the storage system 3 is specified, and the physical path and the storage internal-path are displayed in a linked state. This makes it possible for a manager to know in detail the route from a host to an LDEV.

Further, in accordance with the above-mentioned embodiment, by making an alternate path correspond to a physical path, it is possible to specify an alternate path, which becomes unusable when a malfunction occurs in a physical path. By virtue of displaying the specified unusable alternate path and the physical path in which a malfunction has occurred, a manager is capable of rapidly specifying which physical path should be restored in order to restore which alternate path.

Further, in accordance with the above-mentioned embodiment, when an unusable alternate path is specified, a host, which recognizes this alternate path, is notified as to which alternate path this is. This makes it possible to reduce the frequency with which this host switches over to an unusable alternate path.

Further, in accordance with the above-mentioned embodiment, it is possible to notify each host 1 of the LDEV number belonging to the host group ID of this host 1. For example, even if a host 1 recognizes all the LDEV numbers belonging to a storage port name, which it has specified itself, it can cancel those LDEV numbers of the recognized total LDEV numbers, which are not LDEV numbers corresponding to a host group ID, which corresponds to itself, and can prevent access to an LDEV of a cancelled LDEV number. This makes it possible to prevent access to an LDEV, which is assigned an LDEV number belonging to a host group ID, which does not correspond to this host 1.

However, a number of other embodiments can be considered.

Figure 21B:
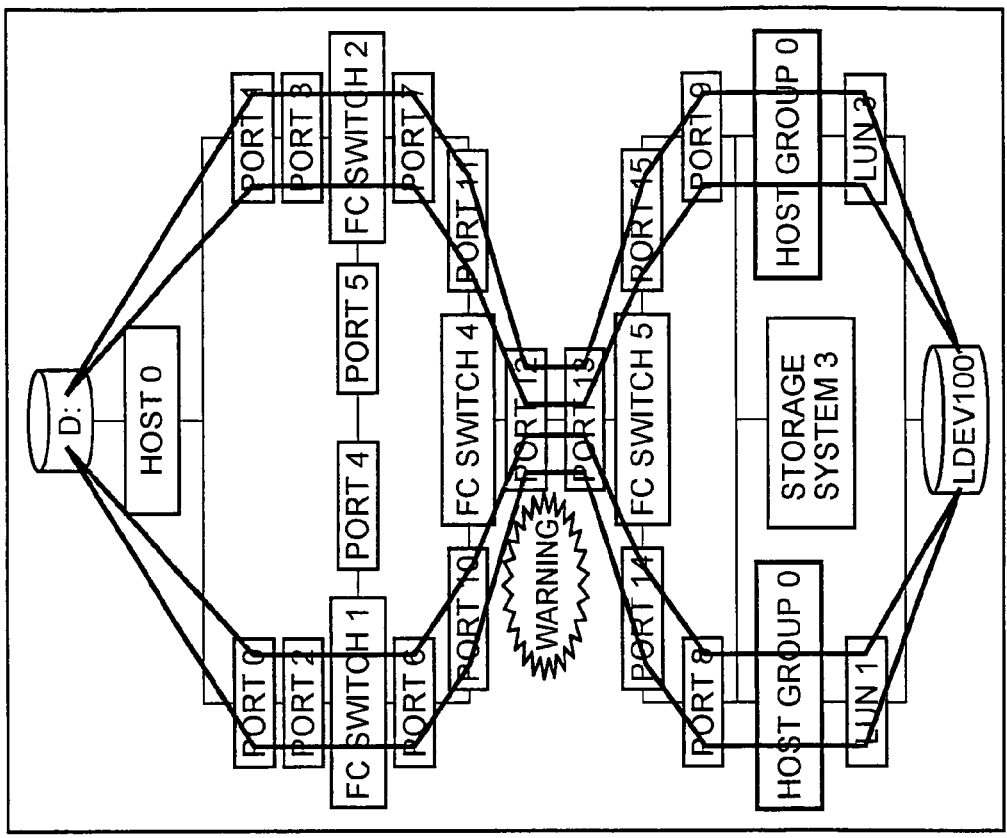
FIG. 21B shows an example of a screen displayed in another second embodiment of the present invention.
Figure 21A:
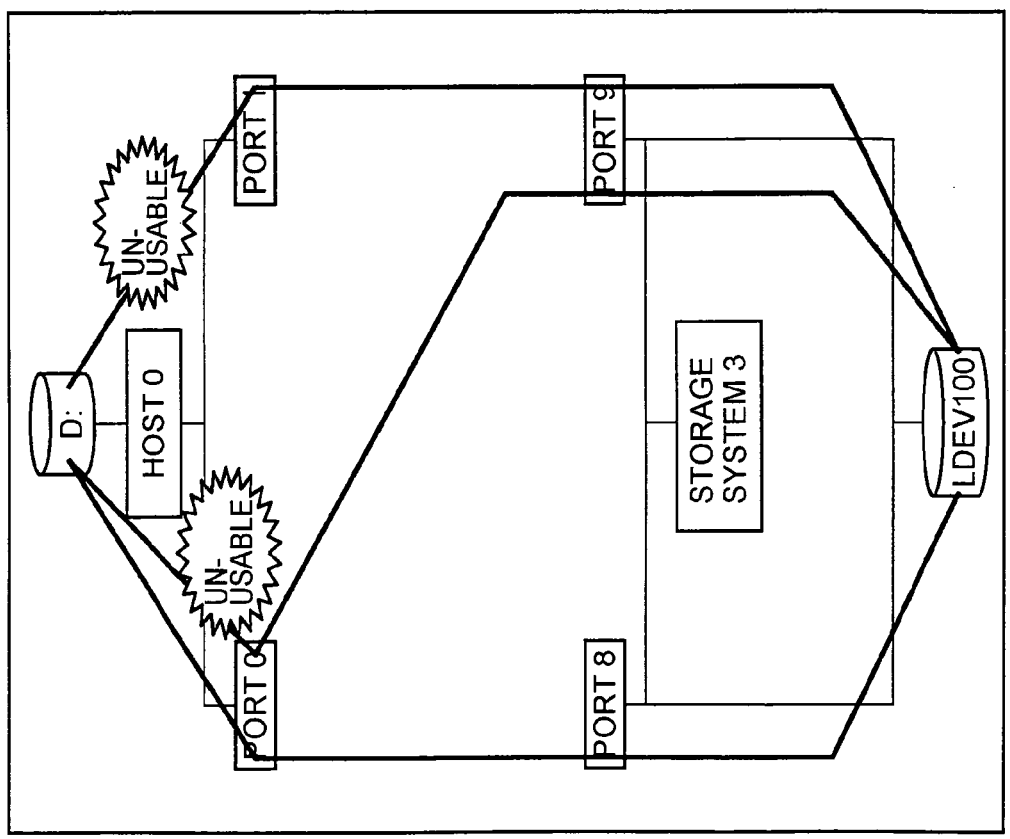
FIG. 21A shows an example of a screen displayed in another first embodiment of the present invention.

For example, in another first embodiment, as illustrated in FIG. 21A, the SAN management software 31 can delete and display either the icon of a FC switch or a display related thereto from the screen illustrated in FIG. 18B.

Further, for example, in another second embodiment, as illustrated in FIG. 21B, when an alternate path is superimposed on a physical path and storage internal-path, the SAN management software can issue a warning when a portion of a prescribed number or more (for example, all of) the alternate paths overlap a certain portion of a certain physical path. This warning, for example, warns that, when a malfunction occurs in a portion of this certain physical path, the use of a prescribed number or more of alternate paths is not possible. To put it another way, it is a warning that a so-called single-point malfunction of a physical path makes it impossible to use a prescribed number or more of alternate paths.

Figure 22:
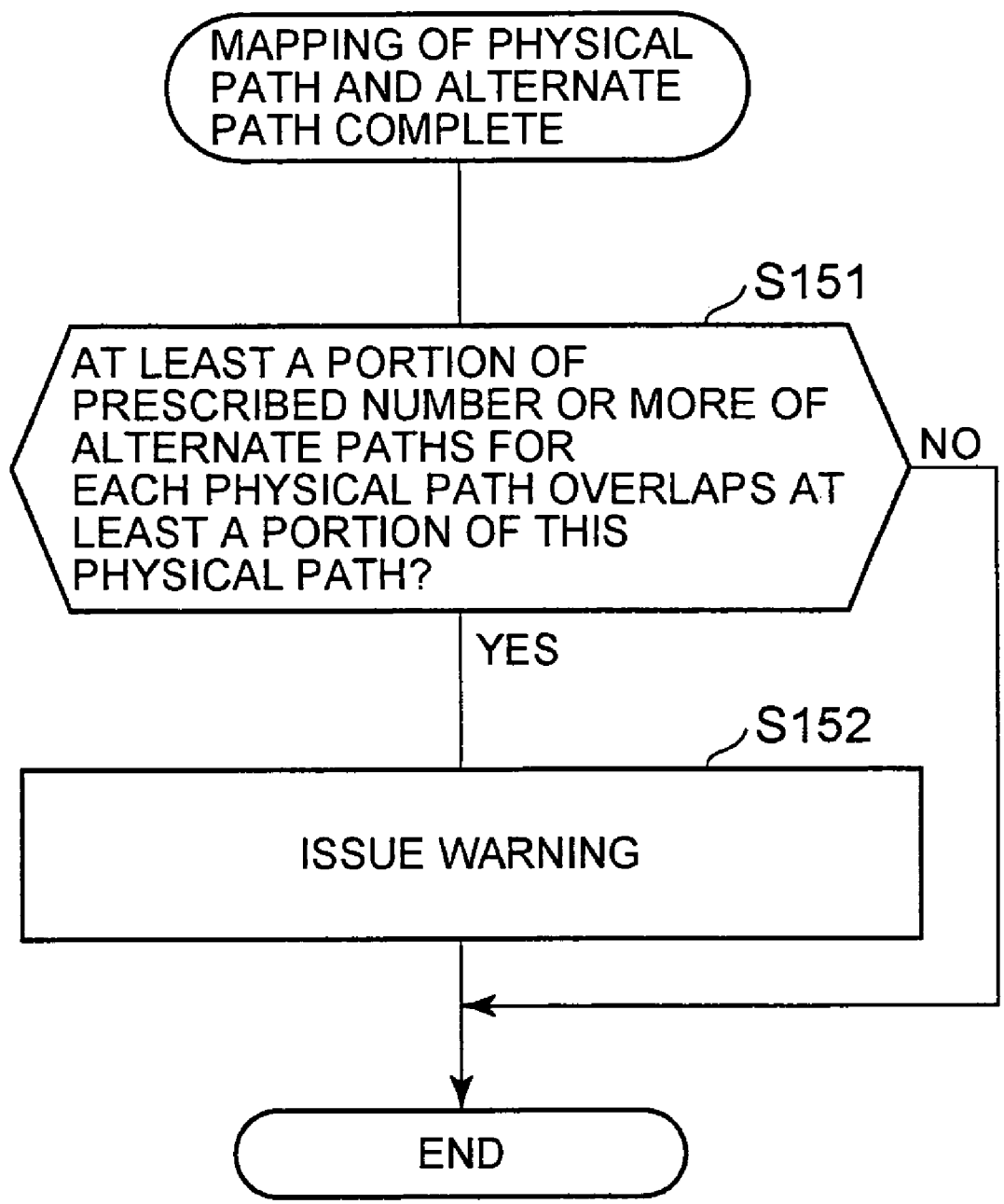
FIG. 22 shows an example of a processing flow, which SAN management software 31 carries out in another second embodiment of the present invention.

FIG. 22 shows an example of the flow of processing carried out by the SAN management software 31 in another second embodiment of the present invention.

After the mapping of a physical path and an alternate path is complete (for example, after the integrated path building process of FIGS. 7 and 8 is finished), the SAN management software 31 determines, at a prescribed timing, and for each physical path, whether or not at least a portion of a prescribed number or more of alternate paths overlaps at least a portion of this physical path (S151).

When it is determined via S151 that there is overlap (S151: YES), the SAN management software 131 can issue a warning (S152). More specifically, for example, as shown in FIG. 21B the SAN management software 31 can make a notification that a prescribed number or more of alternate paths will not be capable of being used when a malfunction occurs at a certain part of a particular physical path. Even more specifically, for example, the SAN management software 31 can display a screen on which an alternate path is superimposed over a physical path and a storage internal-path, and it can display the word "Warning" on this screen in the vicinity of the part of the physical path where a prescribed number or more of alternate paths will become unusable if a malfunction occurs. By looking at this screen, for example, a manager can learn in advance that all four alternate paths will become unusable if a malfunction occurs in either "FC switch 4", "FC switch 5" or the connection therebetween.

A number of preferred embodiments of the present invention have been explained hereinabove, but it goes without saying that the present invention is not limited to these embodiments, and a variety of changes are possible without departing from the gist thereof.

For example, either instead of or in addition to the display device 26 of the management server 21, a prepared screen and other such objects displayed by the SAN management software 31 can also be displayed on a display device of another device, which is connected in a communicable condition to the management server 21 (for example, an SVP 281 or a host 1).

Further, for example, the SAN management software 31 can also be installed in either a storage system 3 (in particular, for example, an SVP 281) or a host 1. In other words, instead of a management server 21, at least one of a storage system 3 and a host 1 can carry out the integrated path building process, and can display either one or both of a physical path and a storage internal-path, and superimpose an alternate path over this display.

What is claimed is:

1. A computer readable recording medium having recorded thereon a computer program for a computer system in which a host computer and a storage system are connected via at least one intermediate device to enable communication, wherein said storage system includes a storage device capable of data storage, and said host computer recognizes a logical path from said host computer to said storage device, said computer program when executed causes said computer to perform the steps of:
   specifying a plurality of physical paths, which exists between said host computer and said storage system;
   specifying to which physical path of said specified plurality of physical paths said logical paths corresponds; and
   making said logical path correspond to said specified physical path,
   wherein each of said at least one intermediate device comprises a plurality of intermediate ports, which are ports to be connected to said host computer, said storage system or another intermediate device,
   wherein said host comprises a host port, which is a port to be connected to an intermediate device, and a storage resource capable of storing said logical path,
   wherein said storage system comprises a storage port, which is a port to be connected to an intermediate device,
   wherein said logical path is represented by a host/storage port identifier (ID) for specifying at least one from among said host port and said storage port, and a storage device ID for specifying said storage device,
   wherein said physical path is represented by a host port ID for specifying said host port, an intermediate port ID for specifying said intermediate port, and a storage port ID for specifying said storage port, and
   said computer program when executed further causes said computer system to perform the step of:
   specifying the physical path to which said logical path corresponds, by specifying, from among said plurality of physical paths, a physical path comprising either a storage port ID or a host port ID, which conforms to a host/storage port ID contained in said logical path.

2. The computer program according to claim 1, wherein said computer program when executed further causes said computer system to perform the steps of:
   acquiring first node information comprising said host port ID, and the intermediate port ID of an intermediate port connected to the host port corresponding to this host port ID;
   acquiring second node information, which is node information of each intermediate device, and which comprises an intermediate port ID corresponding respectively to all the intermediate ports of this intermediate device, and a port ID of another port connected to the respective intermediate ports;
   acquiring third node information comprising said storage port ID, and an intermediate port ID of an intermediate port connected to a storage port corresponding to this storage port ID; and
   specifying said plurality of physical paths, by analyzing a node information group comprising said acquired first node information, second node information, and third node information, and specifying which port having a port ID is connected to which other port having a port ID.

3. A computer readable recording medium having recorded thereon a computer program for a computer system in which a host computer and a storage system are connected via at least one intermediate device to enable communication, wherein said storage system includes a storage device capable of data storage, and said host computer recognizes a logical path from said host computer to said storage device, said computer program when executed causes said computer system to perform the steps of:
   specifying a plurality of physical paths, which exist between said host computer and said storage system;
   specifying to which physical path of said specified plurality of physical paths said logical path corresponds;
   making said logical path correspond to said specified physical path;
   detecting an occurrence of a malfunction in a node, which is either said host computer, said storage system, or said intermediate device;
   specifying the physical path comprising said malfunctioning node; and
   determining whether or not said logical path corresponds to said specified physical path, and, when it has been determined that said logical path corresponds to said specified physical path, executing a prescribed process,
   wherein said computer program is for a computer system in which said host computer is constituted so as to recognize a plurality of logical paths to a same storage device, and to access said storage device by using an arbitrary logical path from among said plurality of logical paths, and
   wherein said computer program when executed further causes said computer system to perform the step of:
   notifying a host computer, which recognizes said logical path, of the fact that said logical path is an unusable logical path.

4. A computer readable recording medium having recorded thereon a computer program for a computer system in which a host computer and a storage system are connected via at least one intermediate device to enable communication, wherein said storage system includes a storage device capable of data storage, and said host computer recognizes a logical path from said host computer to said storage device, said computer program when executed causes said computer system to perform the steps of:

specifying a plurality of physical paths, which exist between said host computer and said storage system;

specifying to which physical path of said specified plurality of physical paths said logical path corresponds;

making said logical path correspond to said specified physical path;

detecting an occurrence of a malfunction in a node, which is either said host computer, said storage system, or said intermediate device;

specifying the physical path comprising said malfunctioning node; and determining whether or not said logical path corresponds to said specified physical path, and, when it has been determined that said logical path corresponds to said specified physical path, executing a prescribed process, wherein said computer program is for a computer system in which said host computer is constituted so as to recognize a plurality of logical paths to a same storage device, and to access said storage device by using an arbitrary logical path from among said plurality of logical paths, wherein said computer program when executed further causes said computer system to perform the step of:

preparing and outputting information denoting which logical path of said plurality of logical paths corresponds to which physical paths of said plurality of physical paths, where a malfunction occurred on said specified physical path, and the fact that the logical path corresponding to said specified physical path has become unusable.

5. An access path management method for a system in which a host computer and a storage system are connected via at least one intermediate device to enable communication, wherein said storage system comprises a storage device capable of data storage, wherein said host recognizes a logical path from said host computer to said storage device, said access path management method comprising the steps of:

specifying a plurality of physical paths which exist between said host computer and said storage system;

specifying to which physical path of said specified plurality of physical paths said logical path corresponds; and making said logical path correspond to said specified physical path, wherein each intermediate device comprises a plurality of intermediate ports, which are ports to be connected to said host, said storage system or another intermediate device, wherein said host computer comprises a host port, which is a port to be connected to an intermediate device, and a storage resource capable of storing said logical path, wherein said storage system comprises a storage port, which is a port to be connected to an intermediate device, wherein said logical path is represented by a host/storage port identifier (ID) for specifying at least one from among said host port and said storage port, and a storage device ID for specifying said storage device, wherein said physical path is expressed by a host port ID for specifying said host port, an intermediate port ID for specifying said intermediate port, and a storage port ID for specifying said storage port, and wherein said logical path specifies a physical path to which said logical path corresponds, by specifying, from among said plurality of physical paths, a physical path comprising either a storage ID or a host port ID which conforms to a host/storage port ID contained in said logical path.

6. The access path management method according to claim 5, further comprising the steps of:

acquiring first node information comprising said host port ID, and the intermediate port ID of an intermediate port connected to the host port corresponding to this host port ID;

acquiring second node information, which is node information of each intermediate device, and which comprises an intermediate port ID corresponding respectively to all the intermediate ports of this intermediate device, and a port ID of another port connected to the respective intermediate ports;

acquiring third node information comprising said storage port ID, and an intermediate port ID of an intermediate port connected to a storage port corresponding to this storage port ID; and specifying said plurality of physical paths, by analyzing a node information group comprising said acquired first node information, second node information, and third node information, and specifying which port having a port ID is connected to which other port having a port ID.

7. An access path management method for a system in which a host computer and a storage system are connected via at least one intermediate device to enable communication, wherein said storage system comprises a storage device capable of data storage, wherein said host recognizes a logical path from said host computer to said storage device, said access path management method comprising the steps of:

specifying a plurality of physical paths which exist between said host computer and said storage system;

specifying to which physical path of said specified plurality of physical paths said logical path corresponds;

making said logical path correspond to said specified physical path;

detecting the fact that a malfunction occurred in a node, which is either said host computer, said storage system, or said intermediate device;

specifying the physical path comprising said malfunctioning node; and determining whether or not said logical path corresponds to said specified physical path, and, when it has been determined that said logical path corresponds to said specified physical path, executing a prescribed process, wherein said method is for a system in which said host is constituted so as to recognize a plurality of logical paths to a same storage device, and to access said storage device by using an arbitrary logical path from among said plurality of logical paths, wherein said method further comprising the step of:

notifying a host computer, which recognizes said logical path, of the fact that said logical path is an unusable logical path.

8. An access path management method for a system in which a host computer and a storage system are connected via at least one intermediate device to enable communication, wherein said storage system comprises a storage device capable of data storage, wherein said host recognizes a logical path from said host computer to said storage device, said access path management method comprising the steps of:

specifying a plurality of physical paths which exist between said host computer and said storage system;

specifying to which physical path of said specified plurality of physical paths said logical path corresponds;

making said logical path correspond to said specified physical path;

detecting the fact that a malfunction occurred in a node, which is either said host computer, said storage system, or said intermediate device;

specifying the physical path comprising said malfunctioning node; and determining whether or not said logical path corresponds to said specified physical path, and, when it has been determined that said logical path corresponds to said specified physical path, executing a prescribed process, wherein said method is for a system in which said host computer is constituted so as to recognize a plurality of logical paths to a same storage device, and to access said storage device by using an arbitrary logical path from among said plurality of logical paths, and wherein said method further comprising the step of:

processing, information denoting which logical path of said plurality of logical paths corresponds to which physical path of said plurality of physical paths, where a malfunction occurred on said specified physical path, and the fact that the logical path corresponding to said specified physical path has become unusable are prepared and output.

9. A computer readable recording medium having recorded thereon a computer program for a computer system in which a host computer and a storage system are connected via at least one intermediate device to enable communication, wherein each intermediate device comprises a plurality of intermediate ports, which are ports to be connected to said host computer, said storage system or another intermediate device, wherein said storage system comprises a storage device capable of storing data, and a storage port, which is a port to be connected to an intermediate device, wherein said host computer comprises a host port, which is a port to be connected to an intermediate device, and a storage resource for storing a logical path from said host to said storage device, wherein said logical path is represented by a host/storage port identifier (ID) for specifying at least one of said host port and said storage port, and a storage device ID for specifying said storage device, and wherein a physical path, which connects said host computer and said storage system, is represented by a host port ID for specifying said host port, an intermediate port ID for specifying said intermediate port, and a storage port ID for specifying said storage port, said computer program when executed causes said computer to perform the steps of:

acquiring first node information comprising said host port ID, and the intermediate port ID of an intermediate port connected to the host port corresponding to this host port ID;

acquiring second node information, which is node information of each intermediate device, and which comprises an intermediate port ID corresponding respectively to all the intermediate ports comprising this intermediate device, and a port ID of another port connected to the respective intermediate ports;

acquiring third node information comprising said storage node ID, and an intermediate port ID of an intermediate port connected to a storage port corresponding to this storage port ID;

specifying said plurality of physical paths, which exist between said host and said storage system, by analyzing a node information group comprising said acquired first node information, second node information, and third node information, and specifying which port having a port ID is connected to which other port having a port ID;

specifying which physical path of said specified plurality of physical paths said logical path corresponds to by specifying from among said plurality of physical paths a physical path comprising either a storage ID or a host port ID, which conforms to a host/storage port ID contained said logical path;

making said logical path correspond to said specified physical path; and preparing and outputting information for displaying to which physical path said logical path corresponds.

* * * * *